United States Patent
Fong et al.

(10) Patent No.: US 11,696,304 B2
(45) Date of Patent: Jul. 4, 2023

(54) SCHEDULING SIDELINK RESOURCES FOR MULTIPLE UNICASTS BY A SINGLE DOWNLINK CONTROL INFORMATION MESSAGE

(71) Applicant: QUALCOMM Incorporated, San Diego, CA (US)

(72) Inventors: Lik Hang Silas Fong, Bridgewater, NJ (US); Jing Sun, San Diego, CA (US); Piyush Gupta, Bridgewater, NJ (US); Xiaoxia Zhang, San Diego, CA (US); Junyi Li, Fairless Hills, NJ (US); Xiaojie Wang, Hillsborough, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 24 days.

(21) Appl. No.: 17/338,496

(22) Filed: Jun. 3, 2021

(65) Prior Publication Data
US 2021/0410179 A1 Dec. 30, 2021

Related U.S. Application Data

(60) Provisional application No. 63/045,526, filed on Jun. 29, 2020.

(51) Int. Cl.
*H04W 28/02* (2009.01)
*H04W 72/23* (2023.01)
*H04L 5/00* (2006.01)

(52) U.S. Cl.
CPC ........... *H04W 72/23* (2023.01); *H04L 5/0055* (2013.01); *H04W 28/0278* (2013.01)

(58) Field of Classification Search
CPC ............. H04W 72/14; H04W 28/0278; H04W 72/1289; H04L 5/0055
See application file for complete search history.

(56) References Cited

U.S. PATENT DOCUMENTS

| 11,438,101 B2 * | 9/2022 | Ryu .................. H04W 72/0446 |
| 2007/0070880 A1 * | 3/2007 | Cai ......................... H04L 5/023 370/208 |

(Continued)

FOREIGN PATENT DOCUMENTS

| WO | WO-2017171528 A1 | 10/2017 |

OTHER PUBLICATIONS

Convida Wireless: "On Resource Allocation Mode 1 for NR V2X", 3GPP Draft, 3GPP TSG-RAN WG1 #100-bis-e, R1-2002377, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20-Apr. 30, 2020, Apr. 11, 2020 (Apr. 11, 2020), XP051875586, 4 Pages, Retrieved from the Internet: URL: https://ftp.3gpp.org/tsg_ran/WG1_RL1/TSGR1_100b_e/Docs/R1-2002377.zip. R1-2002377, On Resource Allocation Mode 1 for NR V2X-docx. [Retrieved on Apr. 11, 2020] Section 2.1.

(Continued)

*Primary Examiner* — Michael J Moore, Jr.
(74) *Attorney, Agent, or Firm* — Norton Rose Fulbright US LLP

(57) ABSTRACT

This disclosure provides systems, methods, and apparatuses, including computer programs encoded on computer storage media, for wireless communication. In one aspect of the disclosure, a method of wireless communication performed by a user equipment (UE) includes receiving, from a base station, a grant message indicating a set of sidelink resources. The method further includes transmitting multiple unicast messages via multiple subgroups of the set of sidelink resources.

30 Claims, 8 Drawing Sheets

(56) References Cited

U.S. PATENT DOCUMENTS

| | | | |
|---|---|---|---|
| 2017/0353819 A1* | 12/2017 | Yin | H04W 72/1284 |
| 2020/0008253 A1* | 1/2020 | Wakabayashi | H04W 76/11 |
| 2020/0099476 A1 | 3/2020 | Park | |
| 2020/0106500 A1* | 4/2020 | Noh | H04L 5/0055 |
| 2020/0137738 A1* | 4/2020 | Liu | H04L 5/0007 |
| 2020/0374031 A1* | 11/2020 | Baldemair | H04L 5/0057 |
| 2020/0389912 A1* | 12/2020 | Baldemair | H04W 72/23 |
| 2020/0404684 A1 | 12/2020 | Lee et al. | |
| 2020/0413431 A1* | 12/2020 | Park | H04L 1/0016 |
| 2021/0105126 A1* | 4/2021 | Yi | H04W 72/1242 |
| 2021/0127403 A1* | 4/2021 | Ryu | H04W 76/27 |
| 2021/0377993 A1* | 12/2021 | Ayaz | H04W 76/14 |
| 2021/0410179 A1* | 12/2021 | Fong | H04W 72/14 |
| 2022/0015070 A1* | 1/2022 | Chen | H04W 72/0446 |
| 2022/0086855 A1* | 3/2022 | Mallick | H04W 72/1215 |
| 2022/0132603 A1* | 4/2022 | Adjakple | H04W 8/005 |
| 2022/0248434 A1* | 8/2022 | Zhao | H04L 1/08 |

OTHER PUBLICATIONS

Ericsson (Moderator): "TPs for 38.212, 38.213, and 38.214 for the Agreements in [101-e-NR-5G V2X NRSL-Mode-1-02]", 3GPP Draft, 3GPP TSG RAN WG1 #101-e, R1-2005007, 3rd Generation Partnership Project (3GPP), Mobile Competence Centre, 650, Route Des Lucioles, F-06921 Sophia-Antipolis Cedex, France, vol. RAN WG1, No. e-Meeting, May 25-Jun. 5, 2020, Jun. 8, 2020 (Jun. 8, 2020), XP051894359, 9 Pages, Retrieved from the Internet: URL: https://ftp.3gpp.org/tsg_ran/WG1_RL1/TSGR1_101-e/Docs/R1-2005007.zip. R1-2005007—TPs for 38.212, 38.213, and 38.214. docx. [Retrieved on Jun. 8, 2020] Section 1.

International Search Report and Written Opinion—PCT/US2021/035844—ISA/EPO—dated Oct. 8, 2021 (205064WO).

* cited by examiner

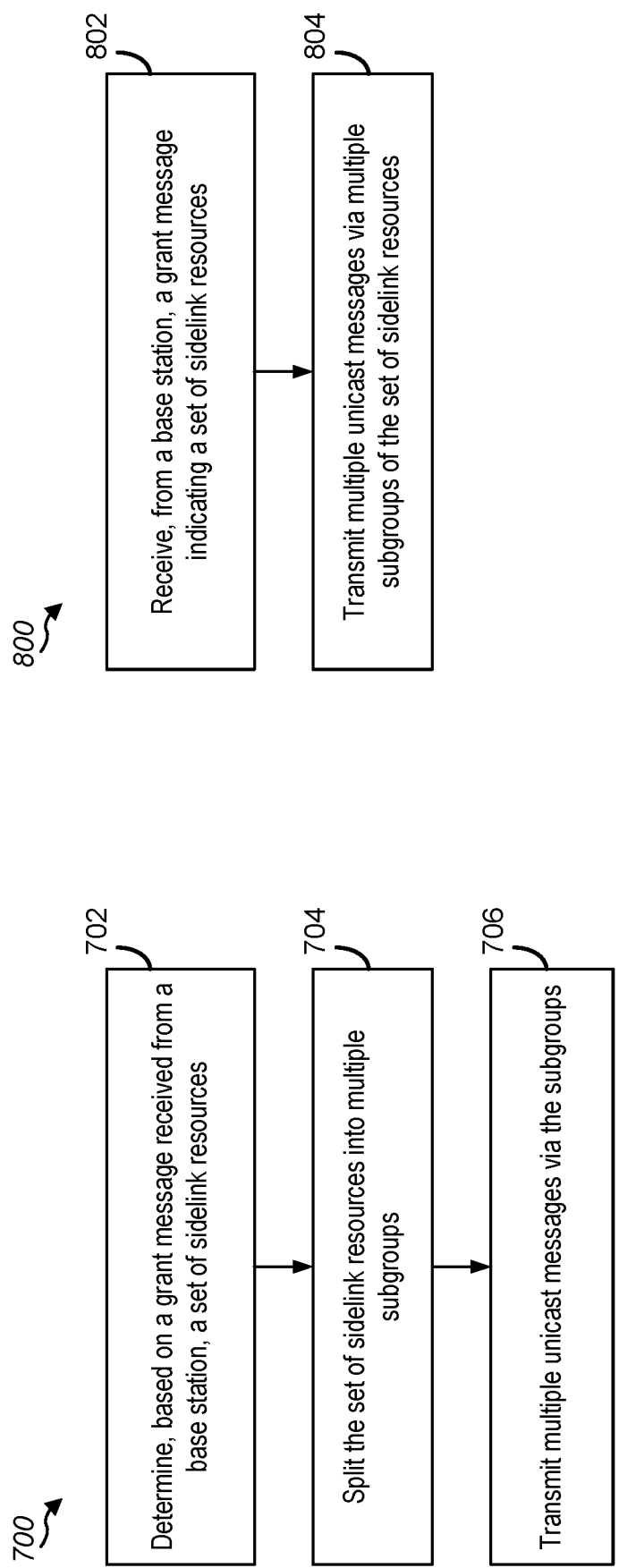

SCHEDULING SIDELINK RESOURCES FOR MULTIPLE UNICASTS BY A SINGLE DOWNLINK CONTROL INFORMATION MESSAGE

CROSS-REFERENCE TO RELATED APPLICATIONS

This application claims the benefit of U.S. Provisional Patent Application No. 63/045,526, entitled, "SCHEDULING SIDELINK RESOURCES FOR MULTIPLE UNICASTS BY A SINGLE DOWNLINK CONTROL INFORMATION MESSAGE," filed on Jun. 29, 2020, which is expressly incorporated by reference herein in its entirety.

TECHNICAL FIELD

Aspects of the present disclosure relate generally to wireless communication systems, and more particularly, to scheduling sidelink resources for unicast.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

The UEs may be utilized in a variety of scenarios, such as in industrial environment control networks in which utilizing wireless links may, for example, reduce the time and expense required for reconfiguration of the control network on the factory floor. However, establishing and maintaining reliable wireless links between an industrial controller and one or industrial Internet of things (IIoT) devices associated therewith can be problematic. For example, the industrial controllers are generally located close to machinery which may cause issues (e.g., shadowing, electrical noise, etc.) in maintaining a reliable and adequate communication link with ones of the many IIoT devices of the control network. Moreover, the latency and reliability requirements for IIoT traffic can prove challenging to meet in a wireless control network implementation. For example, latency and reliability requirements for industrial Internet of things (IIoT) traffic are stringent (e.g., latency≈1-2 ms and reliability≈$10^{-5}$-$10^{-6}$ block error rate (BLER)). Additionally, conventional wireless communication protocols require a base station to allocate resources to a transmitter (TX) device, such as a programmable logic controller (PLC) device, for a sidelink communication. The type of sidelink communication can either be a unicast (to one receiver), a broadcast (to all UEs), or a groupcast (to a set of UEs). In IIOT, the communication is often a unicast message. For each unicast message to be scheduled, the base station needs to send a separate control message, such as a downlink control information (DCI) message. Accordingly, to schedule multiple sidelink unicast resources for multiple unicast messages, multiple DCI control messages need to be sent to the TX device, which increases an amount of overhead traffic of the system and makes the system inefficient.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes receiving, from a base station, a grant message indicating a set of sidelink resources. The method further includes transmitting multiple unicast messages via multiple subgroups of the set of sidelink resources.

Another innovative aspect of the subject matter described in this disclosure can be implemented in a UE. The UE includes at least one processor and a memory coupled with the at least one processor and storing processor-readable instructions that, when executed by the at least one processor, is configured to receive, from a base station, a grant message indicating a set of sidelink resources. The at least one processor is further configured to initiate transmission of multiple unicast messages via multiple subgroups of the set of sidelink resources.

Another innovative aspect of the subject matter described in this disclosure can be implemented in an apparatus configured for wireless communication. The apparatus includes means for receiving, from a base station, a grant message indicating a set of sidelink resources. The apparatus further includes means for transmitting multiple unicast messages via multiple subgroups of the set of sidelink resources.

Another innovative aspect of the subject matter described in this disclosure can be implemented in a non-transitory computer-readable medium storing instructions that, when executed by a processor, cause the processor to perform operations including receiving, from a base station, a grant message indicating a set of sidelink resources; and initiating transmission of multiple unicast messages via multiple subgroups of the set of sidelink resources.

Another innovative aspect of the subject matter described in this disclosure can be implemented in a method of wireless communication performed by a UE. The method includes determining, based on a grant message received from a base station, a set of sidelink resources. The method further includes splitting the set of sidelink resources into multiple subgroups, and transmitting multiple unicast messages via the subgroups.

Another innovative aspect of the subject matter described in this disclosure can be implemented in a UE. The UE includes at least one processor and a memory coupled with the at least one processor and storing processor-readable instructions that, when executed by the at least one processor, is configured to determine, based on a grant message received from a base station, a set of sidelink resources. The at least one processor is further configured to split the set of sidelink resources into multiple subgroups, and initiate transmission of multiple unicast messages via the subgroups.

Another innovative aspect of the subject matter described in this disclosure can be implemented in an apparatus configured for wireless communication. The apparatus includes means for determining, based on a grant message received from a base station, a set of sidelink resources. The apparatus further includes means for splitting the set of sidelink resources into multiple subgroups, and means for transmitting multiple unicast messages via the subgroups.

Another innovative aspect of the subject matter described in this disclosure can be implemented in a non-transitory computer-readable medium storing instructions that, when executed by a processor, cause the processor to perform operations including determining, based on a grant message received from a base station, a set of sidelink resources; splitting the set of sidelink resources into multiple subgroups; and initiating transmission of multiple unicast messages via the subgroups.

Another innovative aspect of the subject matter described in this disclosure can be implemented in a method of wireless communication performed by a base station. The method includes generating a grant message configured to allocate a set of sidelink resources to a UE, and transmitting the grant message to the UE for the UE to schedule unicast messages via different subgroups of the set of sidelink resources.

Another innovative aspect of the subject matter described in this disclosure can be implemented in a base station. The base station includes at least one processor and a memory coupled with the at least one processor and storing processor-readable instructions that, when executed by the at least one processor, is configured to generate a grant message configured to allocate a set of sidelink resources to a UE. The at least one processor is further configured to initiate transmission of the grant message to the UE for the UE to schedule unicast messages via different subgroups of the set of sidelink resources.

Another innovative aspect of the subject matter described in this disclosure can be implemented in an apparatus configured for wireless communication. The apparatus includes means for generating a grant message configured to allocate a set of sidelink resources to a UE, and means for transmitting the grant message to the UE for the UE to schedule unicast messages via different subgroups of the set of sidelink resources.

Another innovative aspect of the subject matter described in this disclosure can be implemented in a non-transitory computer-readable medium storing instructions that, when executed by a processor, cause the processor to perform operations including generating a grant message configured to allocate a set of sidelink resources to a UE, and initiating transmission of the grant message to the UE for the UE to schedule unicast messages via different subgroups of the set of sidelink resources.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow diagram illustrating an example process that supports sidelink resources scheduling for unicast messaging according to some aspects.

FIG. 8 is a flow diagram illustrating an example process that supports sidelink resources scheduling for unicast messaging according to some aspects.

DETAILED DESCRIPTION

Figure 1:
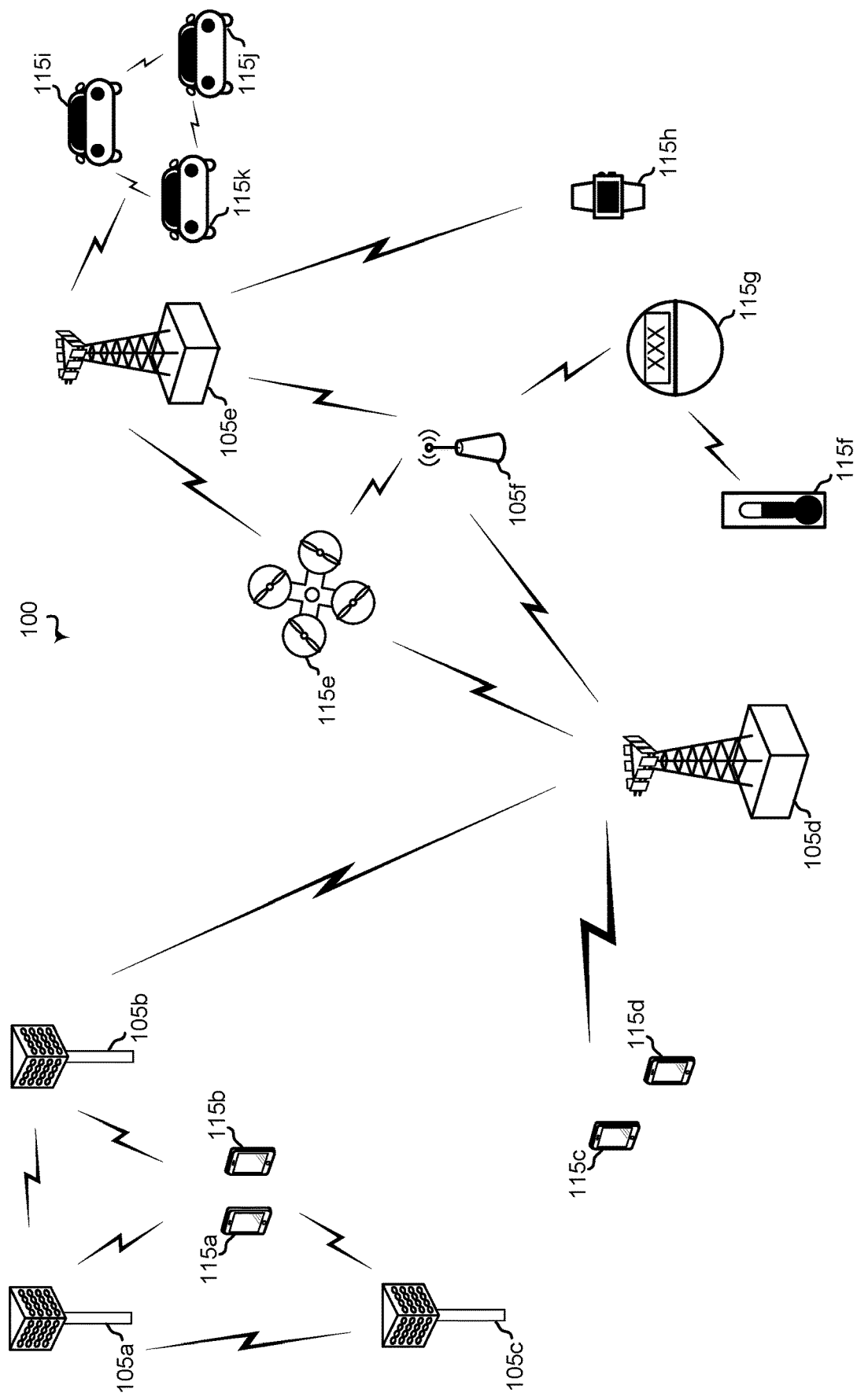
FIG. 1 is a block diagram illustrating details of an example wireless communication system.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for supporting sidelink resource scheduling for unicast messaging operations. For example, the sidelink resources scheduling for unicast messaging operations may be performed by a transmit (TX) user equipment (UE) based on a grant message received from a base station, such as a gNB. To illustrate, the TX UE may receive, from the base station, the grant message indicating a set of sidelink resources. In some implementations, the TX UE may be a programmable logic controller (PLC) device. The grant message includes may include a downlink control information (DCI) message, such as a single DCI having a DCI 3_0 format. In some implementations, the grant message includes a dynamic grant (DG) message or a configured grant (CG) message. Based on the grant message, the TX UE may determine a set of sidelink resources that can be split into multiple subgroups for multiple unicast communication. For example, the TX UE may split the set of sidelink resources into multiple subgroups based on a receive (RX) UE buffer status report, channel state information of an RX UE channel, or a combination thereof. The resource splitting by the TX UE may be transparent to base station, partially known to the base station, or indicated or controlled by the base station. The TX UE may also schedule the multiple unicast messages, and transmit the multiple unicast messages via the subgroups, such as the multiple subgroups of the set of sidelink resources. For example, the TX UE may transmit, to a first receive UE, a first unicast message of the multiple unicast messages via a first subgroup of the subgroups, and transmit, to a second receive UE, a second unicast message of the multiple unicast messages via a second subgroup of the subgroups.

In some implementations, the TX UE may generate a buffer status for each of one or more RX UEs. The TX UE may transmit one or more sidelink buffer status report (BSR) to the base station to request sidelink resources. For example, the TX UE may send a sidelink BSR for each RX UE. Additionally, or alternatively, the TX UE may combining the buffer status of multiple RX UEs to generate the sidelink BSR and send a sidelink BSR for the multiple RX UEs. The sideline BSR may correspond to a request for resources and enable the base station to allocate the set of resources, determine a maximum number of subgroups, determine a number of subgroups of the set of resources, or a combination there. The number of subgroups may be less than or equal to the maximum number of subgroups. For example, the number of subgroups may be one subgroup. In some implementations, the base station may indicate the maximum number of subgroups, the number of subgroups, or a combination thereof, in the grant message, in a radio resource control (RRC) message, or a combination thereof.

In some implementations, the TX UE may receive feedback, such as an ACK/NACK from, from a RX UE. Based on the received ACK/NACK, the TX UE may transmit a feedback message to the base station. The feedback message may be responsive to the grant message. In some implementations, the feedback message may be used, such as by the base station, to determine additional resources requested by the TX UE. The feedback message may be a single feedback message (corresponding to multiple ACKs/NACKs received by the TX UE) or multiple feedback messages (each feedback message corresponding to a different ACK/NACK). The feedback message may include an ACK/NACK indicator, such as a single bit or multiple bits. In some implementations, the feedback message includes an ACK/NACK indicator for each subgroup or an ACK/NACK indicator for each subgroup of a maximum number of subgroups. Additionally, or alternatively, the feedback message may be configured to indicate, for the number of subgroups, a number of ACKs, a number of NACKS, or both. In some implementations, the ACK/NACK indicator includes multiple bits and a value of the multiple bits indicates or corresponds to an amount of resources requested by the TX UE.

Particular implementations of the subject matter described in this disclosure can be implemented to realize one or more of the following potential advantages. In some aspects, the present disclosure provides techniques for sidelink resources scheduling for unicast messaging operations. For example, the TX UE may receive a set of resource from a base station and may divide and allocate portions of the set of resources according to a need of the TX UE. For example, the TX UE may use different portions to send unicast message to different RX UEs. Accordingly, the techniques described herein may enable a single grant message, such as a single DCI (e.g., a DCI having a DCI 3_0 format) to be used for the TX to schedule multiple unicast message. By scheduling and transmitting multiple unicast message responsive to one grant message, an amount of overhead message is reduced as compared to convention techniques, such as V2X messaging techniques.

This disclosure relates generally to providing or participating in sidelink resource scheduling for unicast messaging operations. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may also be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
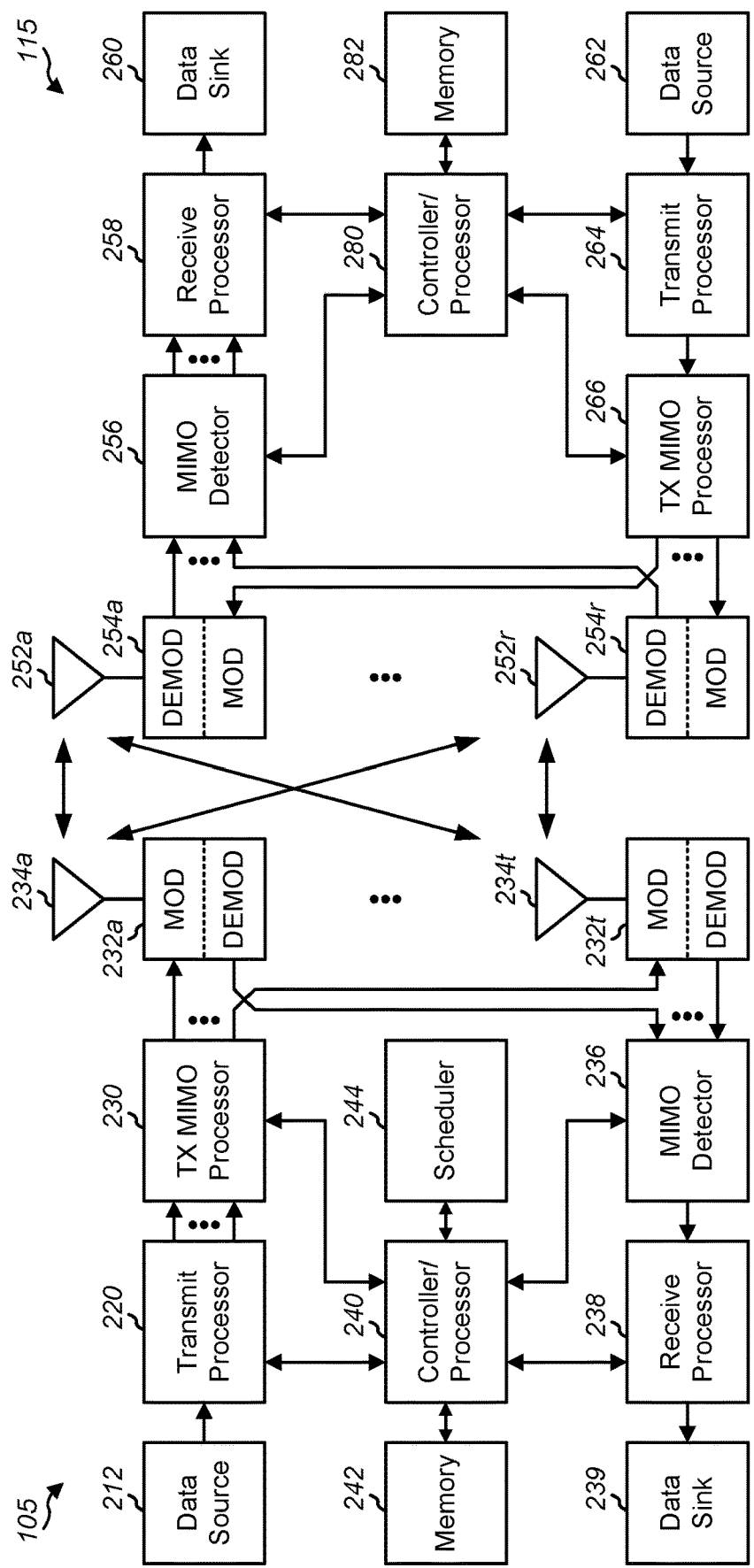
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 3-10, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

In an example implementation of wireless network 100, one or more of UEs 115 may comprise various forms of IoT devices, such as industrial Internet of things (IIoT) devices, in communication via wireless links of wireless network 100. For example, the IIoT devices of some deployments may comprise sensors (e.g., position sensors, temperature sensors, pressure sensors, power sensors, motion detectors, proximity detectors, accelerometers, scanners, cameras, probes, switches, etc.), actuators (e.g., linear actuators, rotary actuators, servomechanism, solenoid, stepper motor, electric motor, comb drive actuators, etc.), or a combination thereof. A large number of IIoT devices may be in communication with a corresponding device, such as an industrial controller (e.g., computer, programmable logic controller (PLC), supervisory control and data acquisition (SCADA) system, etc.), of control network in an industrial environment, such as a manufacturing facility, materials processing facility, warehouse, etc. For example, a PLC may be in communication with 20-50 sensors and/or actuators, wherein 100-1000 such PLCs may be deployed throughout an industrial (e.g., manufacturing) facility.

Figure 3:
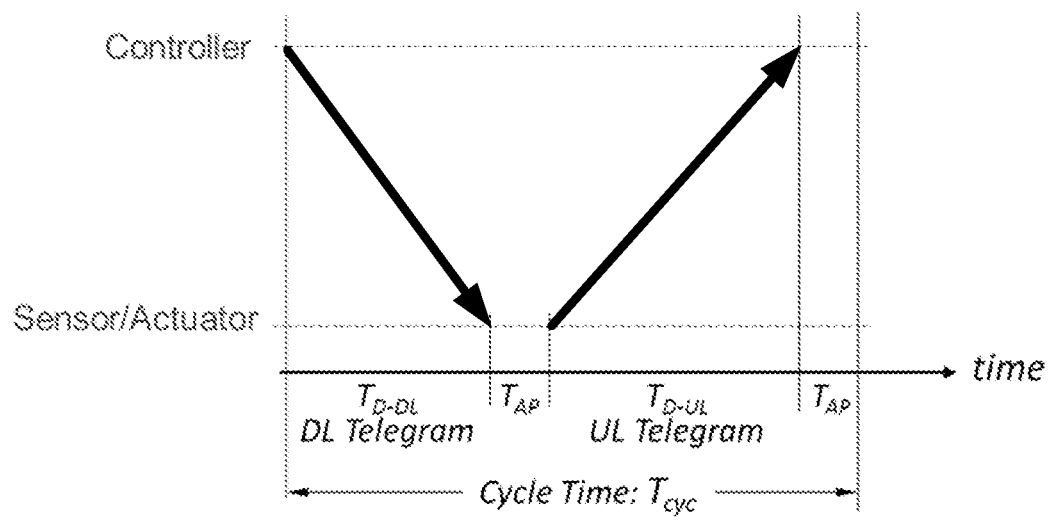
FIG. 3 is a diagram illustrating the deterministic and periodic nature of industrial Internet of things (IIoT) traffic.

The various IIoT devices of an industrial environment control network may periodically communicate information (e.g., measurements, state information, command acknowledgments, etc.) to or receive information (e.g., commands, parameters, settings, state information, etc.) from an associated industrial controller. For example, cyclic exchanges may be performed between an industrial controller and a large number of IIoT devices of a control network. Accordingly, the IIoT traffic may be deterministic and periodic, as represented in the diagram of FIG. 3.

Latency and reliability requirements for IIoT traffic are often stringent since output results typically must be produced in response to input conditions within a limited time to avoid unintended, and even dangerous, operation of an industrial process. For example, latency requirements of IIoT traffic may be on the order of 1-2 ms and the reliability requirements may be on the order of $10^{-5}$-$10^{-6}$ block error rate (BLER). Accordingly, both data and control channels of an industrial environment control network may be designed to meet these overall requirements.

Control networks in industrial environments have traditionally utilized wireline communication links. For example, IIoT devices may be in communication with a corresponding industrial controller using wired network links, such as 100 base T Ethernet links. Such a control network may be quite complicated with respect to establishing and maintaining the network links, reconfiguring the network, etc. For example, the task of reconfiguring a control network including a large number of IIoT devices deployed on a factory floor can be costly in both time and expense.

In accordance with aspects of the present disclosure, one or more base stations are utilized in an industrial environment control network, such as for aiding in multi-hop communication links between industrial controllers and/or respective IIoT devices of the control network. For example, one or more base stations 105 of wireless network 100 may be ceiling-mounted, or otherwise disposed (e.g., wall-mounted, mounted atop a pole other structure, etc.), to provide a substantially unobstructed path one or more industrial controllers, some or all IIoT devices of a control network, etc. The example of FIG. 4 shows a portion of wireless network 100 forming industrial environment control network 400 in which base station 105$f$ (e.g., small cell base station) is disposed to aid with respect to communication links with respect to multiple UEs (shown as UEs 115$f$, 115$m$, and 115$n$) of the control network.

Figure 4:
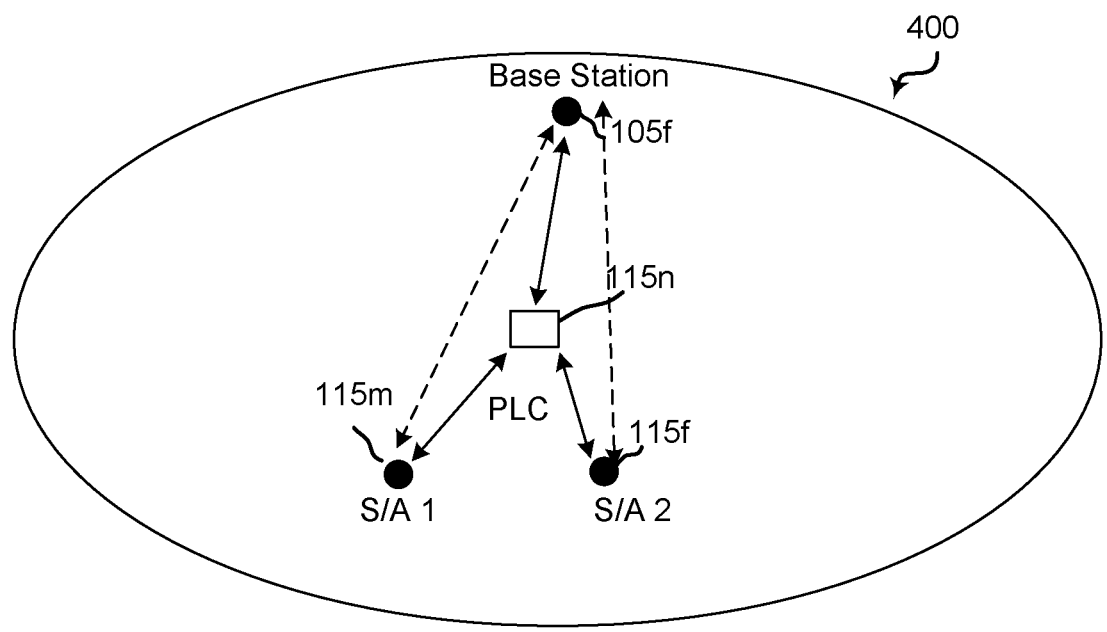
FIG. 4 is a portion of a wireless network forming an industrial environment control network.

Although the example of FIG. 4 is described above as an industrial environment control network 400 in which base station 105$f$ comprises a small cell configuration, UE 115$n$ comprises a PLC configuration, UE 115$f$ comprises a thermometer sensor configuration, and UE 115$m$ comprises a robotic actuator configuration, the example configuration is merely illustrative of a control network in which concepts of the present invention may be applied. It should be appreciated that a control network may comprise various configurations of both base stations (e.g., macro cells, small cells, etc., or combinations thereof), industrial controller UEs, (e.g., computers, PLCs, SCADAs, etc., or combinations thereof), IIoT devices (e.g., position sensors, temperature sensors, pressure sensors, power sensors, motion detectors, proximity detectors, accelerometers, scanners, cameras, probes, switches, linear actuators, rotary actuators, servomechanism, solenoid, stepper motor, electric motor, comb drive actuators, etc., or combinations thereof). Moreover, although the example of FIG. 4 illustrates a single instance of a base station, a single instance of an industrial controller, and two instances of IIoT devices for simplicity, a control environment in which concepts of the present invention may be implemented may comprise different numbers of any or all of the foregoing (e.g., multiple base stations, multiple industrial controllers, and IIoT devices on the order of tens, hundreds, or even thousands).

In the example of FIG. 4, UE 115$n$ may comprise a PLC or other industrial controller providing control functionality with respect to a plurality of sensor and actuator IIoT devices (shown as including UEs 115$f$ and 115$m$ designated as sensor/actuator (S/A) 1 and S/A 2). UE 115$n$ may communicate directly with base station 105$f$, such as using a UE to UMTS (Uu) interface. UE 115$n$ (e.g., industrial controller) may implement sidelinks (i.e., communication links directly between UEs) with respect to UEs 115$f$ (e.g., thermometer) and 115$m$ (e.g., robotic actuator), such as using a UE to UE interface (e.g., a PC5 interface of a V2X mesh network). Multi-hop communication may be provided between UEs 115$m$ and 115$f$ and base station 105$f$ via UE 115$n$. Base station 105$f$ may additionally or alternatively establish direct communication links with various ones of the IIoT devices of a control network (e.g., UE 115$f$, UE 115$m$, etc.), such as using a Uu interface.

Existing V2X interface protocols provide for dynamic and configured grants for sidelinks (e.g., a physical sidelink control channel (PSCCH) and/or physical sidelink shared channel) using a PC5 interface. A DG may provide a one-time grant of sidelink resources, such as responsive to instantaneous demand/need for sidelink communication. A CG may provide a grant of sidelink resources enabling continued/periodic/repeated sidelink communication. A first type of sidelink resource grant (Type 1) of the V2X interface protocols uses RRC to configure a UE with resources of a CG. A second type of sidelink resource grant (Type 2) of the V2X interface protocols uses DCI over a PDCCH to configure a UE with resources of a DG or a CG. For example, the DCI may be a DG and provide allocation of resources to be used for sidelink communication. Alternatively, the DCI may be a CG and activate/deactivate a CG for sidelink communication.

Figure 5:
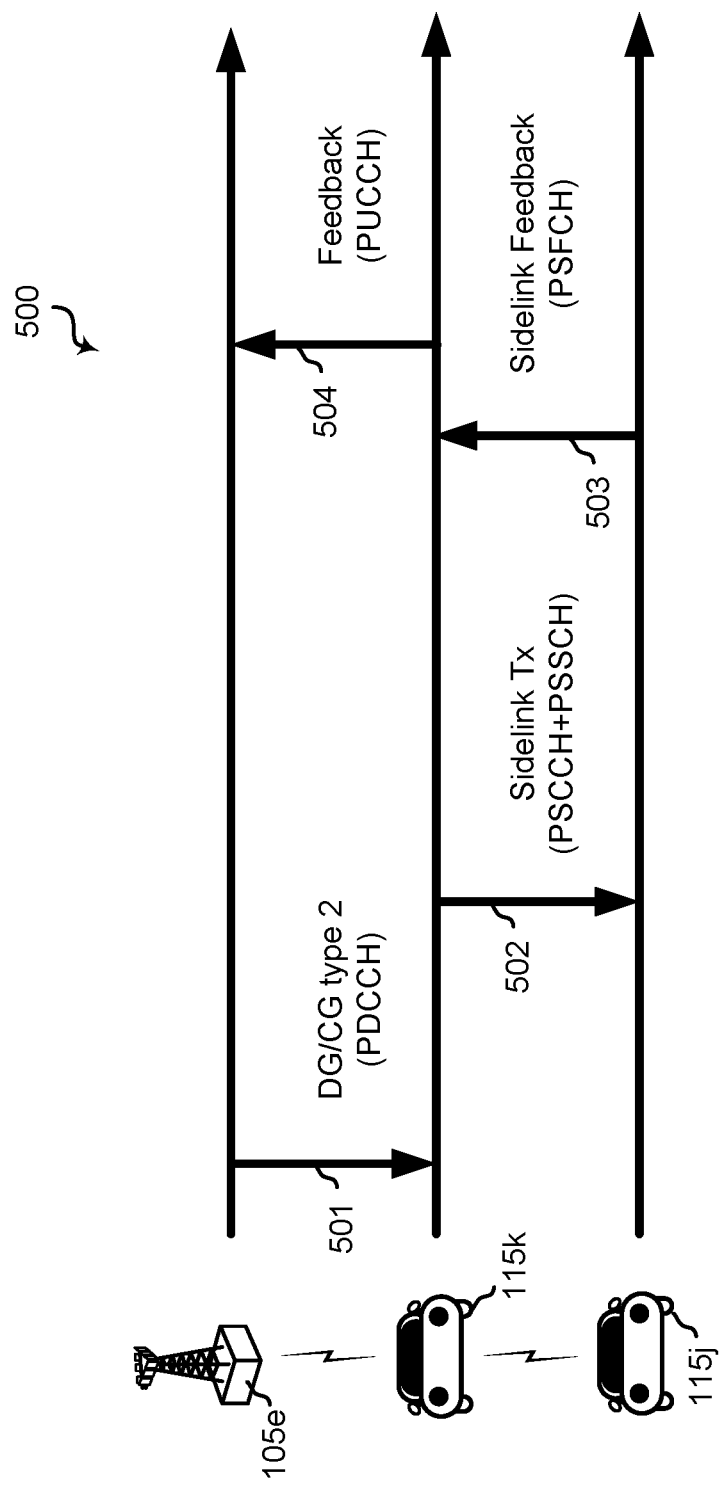
FIG. 5 is a physical-layer procedure flow for sidelink resource grants in accordance with vehicle-to-everything (V2X) interface dynamic grant (DG)/configured grant (CG) Type 2 protocols.

FIG. 5 illustrates a physical-layer procedure flow (procedure flow 500) for sidelink resource grants in accordance with the above mentioned V2X interface DG/CG Type 2 protocols. Procedure flow 500 of FIG. 5 is described with reference to a V2X mesh network between UEs 115i and 115k communicating with macro base station 105e, as shown in wireless network 100 of FIG. 1. It should be understood, however, that the procedure flow may be implemented with respect to various UEs and UE configurations.

In procedure flow 500 of FIG. 5, base station 105a uses DCI, provided according to DCI format 3_0 and which is configured to correspond to UE 115k (e.g., sidelink TX UE), to deliver a DG/CG Type 2 to UE 115k at procedure 501. DCI format 3_0 provides fields for time gap, hybrid automatic repeat request (HARQ) process identification, new data indicator, lowest index of the subchannel allocation to the initial transmission, first-stage sidelink control information (SCI) format 0-1 fields (including frequency resource assignment and time resource assignment), physical sidelink feedback channel (PSFCH) to HARQ feedback timing indicator, and PUCCH resource indicator, as well as configuration index in the case of CG. Base station 105a prepares the DCI with a sidelink-radio network temporary identifier (SL-RNTI) for UE 115, in the case of DG, or sidelink-configured scheduling-radio network temporary identifier (SL-CS-RNTI) for UE 115k, in the case of CG, to configure the DCI to correspond to UE 115k. In particular, the cyclic redundancy check (CRC) of the DCI is scrambled by SL-RNTI or SL-CS-RNTI for UE 115K in order to deliver a DG/CG Type 2 to the UE (e.g., sidelink TX UE).

In the case of CG, UE 115k (e.g., sidelink TX UE) reports the activation (or deactivation) of a sidelink (not shown in procedure flow 500). In particular, activation/deactivation of a CG sidelink is reported through media access control-control element (MAC-CE). MAC-CE reporting is also used by UE 115k to provide sidelink buffer status reports (BSRs) to base station 105e. For example, UE 115k may have provided a BSR indicating data for sidelink communication is contained in the UE buffer, resulting in initiating the sidelink resource grant of procedure 501.

At procedure 502 of procedure flow 500, UE 115k (e.g., sidelink TX UE) uses SCI, provided according to SCI format 0-1 (e.g., for scheduling physical sidelink shared channel (PSSCH) and second-stage SCI on PSSCH) and SCI format 0-2 (e.g., for decoding PSSCH) to schedule PSSCH and transmits data through PSSCH to UE 115j (e.g., sidelink receiver (RX) UE) according to the DG/CG Type 2 (sidelink resource grant of procedure 501). SCI format 0-1 provides fields for priority, frequency resource assignment, time resource assignment, resource reservation period, demodulation reference signal (DMRS) pattern, second-stage SCI format (broadcast, unicast, groupcast), Beta_offset indicator, number of DMRS port, modulation and coding scheme (MCS), and a reserved field. SCI format 0-2 provides fields for HARQ process identification, new data indicator, redundancy version, source identification, destination identification, and channel state information (CSI) request, also if the second-stage SCI format field in the corresponding SCI provided in SCI format 0-1 indicates type 1 groupcast zone identification and communication range requirement fields are present. MCS selection is up to the sidelink TX UE (e.g., UE 115k in procedure flow 500), within limits set by the base station (e.g., base station 105e).

It can be seen from the foregoing that the base station schedules node resources for the sidelink TX UE (procedure 501) and the sidelink TX UE implements one or more sidelinks with sidelink RX UEs using some or all of the scheduled resources (procedure 502). However, the base station does not control how the sidelink TX UE uses the resources and which UEs are selected as the sidelink RX UEs by the sidelink TX UE. The existing V2X do not enable a base station making a sidelink resource grant to a sidelink TX UE to schedule sidelink resources for a specific sidelink (e.g., a sidelink between that sidelink TX UE and a specified sidelink RX UE). Additionally, existing V2X may provide a single grant for a single sidelink communication, such as a single sidelink unicast communication.

Continuing with procedure flow 500 of FIG. 5, UE 115j (e.g., sidelink RX UE) provides sidelink feedback to UE 115k (e.g., sidelink TX UE) at procedure 503. In particular, UE 115j sends ACK/NACK on PSFCH upon receiving each transmission according to DG/CG Type 2.

At procedure 504 of procedure flow 500, UE 115k (e.g., sidelink TX UE) forwards the sidelink feedback provided by UE 115j (e.g., sidelink RX UE) to base station 105e. In particular, UE 115k forwards the ACK/NACK received from UE 115j to base station 105e on PUCCH.

As discussed above with reference to FIG. 3, IIoT traffic exchanged between an industrial controller and its corresponding IIoT devices is typically deterministic and periodic. Also as discussed above, low latency communication is expected with respect to the IIoT traffic. Accordingly, V2X protocols implementing DG/CG of sidelink resources may be used with respect to IIoT traffic between an IIoT device and a corresponding industrial controller in an attempt to enable low-latency communications. However, although a base station may utilize V2X protocols to schedule resources for a first UE (e.g., sidelink TX UE, such as UE 115k) to implement a sidelink with one or more other UEs (e.g., sidelink RX UEs, such as UE 115j), the base station needs to send a separate control message, such as a downlink control information (DCI) message. Accordingly, to schedule multiple sidelink unicast resources for multiple unicast messages, multiple DCI control messages need to be sent to the TX device, which increases an amount of overhead traffic of the system and makes the system inefficient.

As described herein, the base station and TX UE of FIG. 3 may supporting sidelink resource scheduling for unicast messaging operations. For example, the sidelink resources scheduling for unicast messaging operations may be performed by TX UE based on a grant message received from a base station, such as a gNB. In some implementations, the TX UE may be a PLC device. The grant message includes may include DCI message, such as a single DCI having a DCI 3_0 format. In some implementations, the grant message includes a DG) message or a CG message. Based on the grant message, the TX UE may determine a set of sidelink resources that can be split into multiple subgroups for multiple unicast communication. For example, the TX UE may split the set of sidelink resources into multiple subgroups based on an RX UE buffer status report, channel state information of an RX UE channel, or a combination thereof. The resource splitting by the TX UE may be transparent to base station, partially known to the base station, or indicated or controlled by the base station. The TX UE may also schedule the multiple unicast messages, and transmit the multiple unicast messages via the subgroups. For example, the TX UE may transmit, to a first receive UE, a first unicast message of the multiple unicast messages via a first subgroup of the subgroups, and transmit, to a second receive UE, a second unicast message of the multiple unicast messages via a second subgroup of the subgroups.

Particular implementations of the subject matter described in this disclosure can be implemented to realize one or more of the following potential advantages. In some aspects, the present disclosure provides techniques for sidelink resources scheduling for unicast messaging operations. For example, the TX UE may receive a set of resource from a base station and may divide and allocate portions of the set of resources according to a need of the TX UE. For example, the TX UE may use different portions to send unicast message to different RX UEs. Accordingly, the techniques described herein may enable a single grant message, such as a single DCI (e.g., a DCI having a DCI 3_0 format) to be used for the TX to schedule multiple unicast message. By scheduling and transmitting multiple unicast message responsive to one grant message, an amount of overhead message is reduced as compared to convention techniques, such as V2X messaging techniques.

Figure 6:
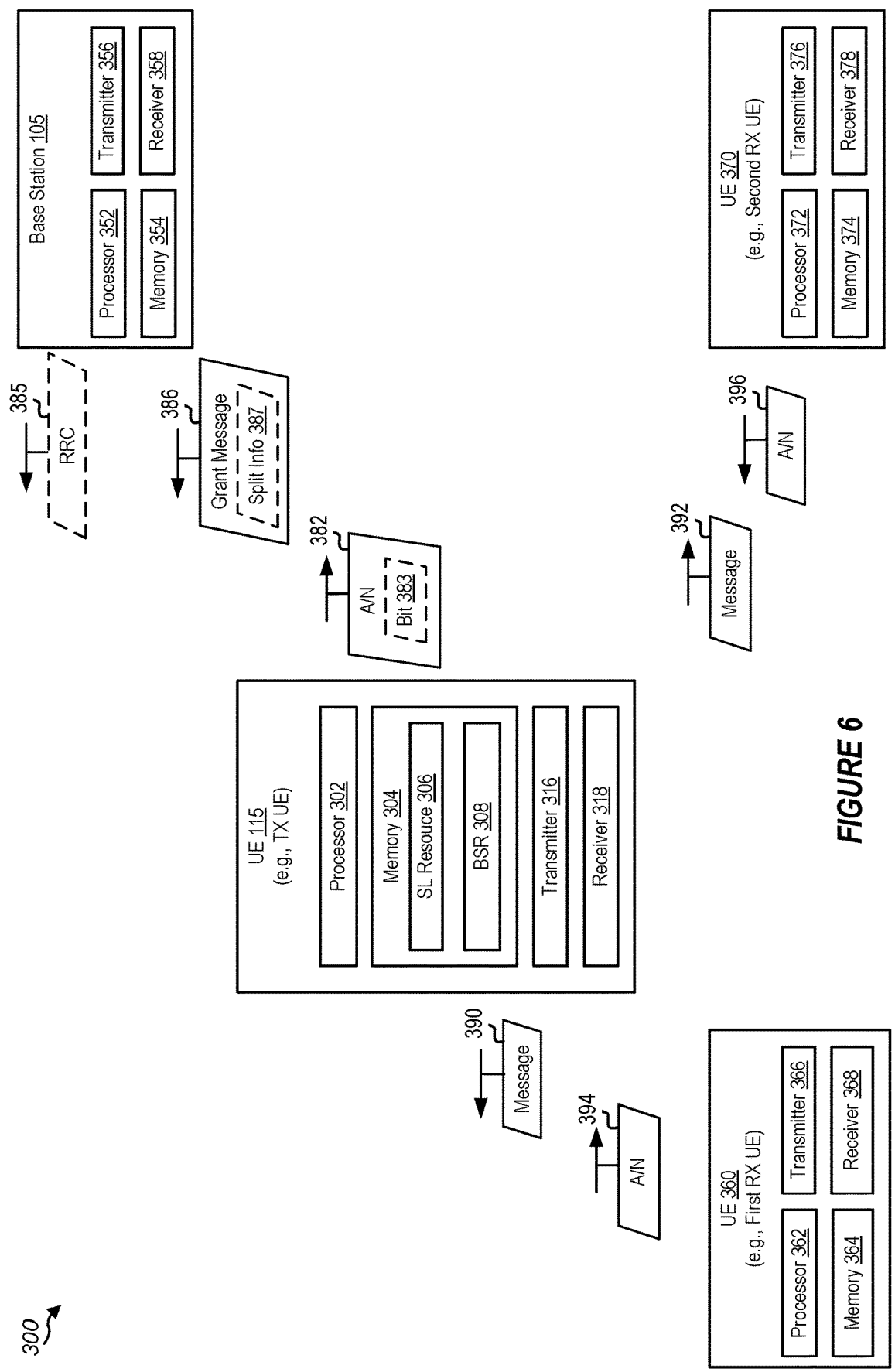
FIG. 6 is a block diagram illustrating an example wireless communication system that supports sidelink resources scheduling for unicast messaging according to some aspects.

FIG. 6 is a block diagram of an example wireless communications system 300 that supports scheduling sidelink resources for multiple unicast messages. In some examples, the wireless communications system 300 may implement aspects of the wireless network 100 or the industrial environment control network 400. The wireless communications system 300 includes the UE 115, the base station 105, a UE 360, and a UE 370. Although three UEs and one base stations are illustrated, in some other implementations, the wireless communications system 300 may generally include fewer than three UEs 115, and may include more than one base station. In some implementations, the UE 115 may include or correspond to a TX UE, such as a PLC or PLC device. Additionally, or alternatively, the base station 105 may include or correspond to a gNB. Further, the UE 360 may include or correspond to a first RX UE, such as a first sensor/actuator (S/A) device, and the UE 370 may include or correspond to a second RX UE, such as a second sensor/actuator (S/A) device.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 316 (hereinafter referred to collectively as "the transmitter 316"), and one or more receivers 318 (hereinafter referred to collectively as "the receiver 318"). The processor 302 may be configured to execute instructions stored in the memory 304 to perform the operations described herein. In some implementations, the processor 302 includes or corresponds to one or more of the receive processor 258, the transmit processor 264, and the controller 280, and the memory 304 includes or corresponds to the memory 282.

In some implementations, the memory 304 is configured to store sidelink (SL) resource information 306 and buffer status report (BSR) information 308. The UE 115 may generate and update the SL resource information 306 based on a grant message received from the base station 105, channel monitoring information, ACK/NACK (A/N) information, or a combination thereof. The BSR information 308 may indicate BSR information corresponding to one or more RX UEs, such as the UEs 360, 370.

The transmitter 316 is configured to transmit reference signals, control information and data to one or more other devices, and the receiver 318 is configured to receive references signals, synchronization signals, control information and data from one or more other devices. For example, the transmitter 316 may transmit signaling, control information and data to, and the receiver 318 may receive signaling, control information and data from, the base station 105. In some implementations, the transmitter 316 and the receiver 318 may be integrated in one or more transceivers. Additionally or alternatively, the transmitter 316 or the receiver 318 may include or correspond to one or more components of the UE 115 described with reference to FIG. 2. In some implementations, the transmitter 316, the receiver 318, or both, may include or correspond to one or more interfaces. For example, the one or more interfaces may include a Uu-interface configured to enable communication with the base station 105 or a PC5 interface configured to enable communication with one or more UEs, such as the UEs 360, 370.

The base station 105 may include or correspond to a severing cell. The base station 105 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller 240, and the memory 354 includes or corresponds to the memory 242. In some implementations, the memory 354 may store information, such as SL resource information 306, BSR information 308, the like, or a combination thereof.

The transmitter 356 is configured to transmit reference signals, synchronization signals, control information and data to one or more other devices, and the receiver 358 is configured to receive reference signals, control information and data from one or more other devices. For example, the transmitter 356 may transmit signaling, control information and data to, and the receiver 358 may receive signaling, control information and data from, the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2. In some implementations, the transmitter 356, the receiver 358, or both, may include or correspond to one or more interfaces. For example, the one or more interfaces may include a Uu-interface configured to enable communication with the UE 115.

The UE 360 may include or correspond to RX UE. The UE 360 can include a variety of components (such as structural, hardware components) used for carrying out one or more functions described herein. For example, these components can include one or more processors 362 (hereinafter referred to collectively as "the processor 362"), one or more memory devices 364 (hereinafter referred to collectively as "the memory 364"), one or more transmitters 366 (hereinafter referred to collectively as "the transmitter 366"), and one or more receivers 368 (hereinafter referred to collectively as "the receiver 368"). The processor 362 may be configured to execute instructions stored in the memory 364 to perform the operations described herein. In some implementations, the processor 362 includes or corresponds to one or more of the receive processor 258, the transmit processor 264, and the controller 280, and the memory 364 includes or corresponds the memory 282.

The transmitter 366 is configured to transmit reference signals, synchronization signals, control information and data to one or more other devices, and the receiver 368 is configured to receive reference signals, control information and data from one or more other devices. For example, the transmitter 366 may transmit signaling, control information and data to, and the receiver 368 may receive signaling, control information and data from, the UE 115. In some implementations, the transmitter 366 and the receiver 368 may be integrated in one or more transceivers. Additionally or alternatively, the transmitter 366 or the receiver 368 may include or correspond to one or more components of the UE 115 described with reference to FIG. 2. In some implementations, the transmitter 366, the receiver 368, or both, may include or correspond to one or more interfaces. For example, the one or more interfaces may include a Uu-interface configured to enable communication with the base station 105 or a PC5 interface configured to enable communication with one or more UEs, such as the UEs 115, 370.

The UE 370 may include or correspond to a RX UE. The UE 370 can include a variety of components (such as structural, hardware components) used for carrying out one or more functions described herein. For example, these components can include one or more processors 372 (hereinafter referred to collectively as "the processor 372"), one or more memory devices 374 (hereinafter referred to collectively as "the memory 374"), one or more transmitters 376 (hereinafter referred to collectively as "the transmitter 376"), and one or more receivers 378 (hereinafter referred to collectively as "the receiver 378"). The processor 372 may be configured to execute instructions stored in the memory 374 to perform the operations described herein. In some implementations, the processor 372 includes or corresponds to one or more of the receive processor 258, the transmit processor 264, and the controller 280, and the memory 374 includes or corresponds to the memory 282.

The transmitter 376 is configured to transmit reference signals, synchronization signals, control information and data to one or more other devices, and the receiver 378 is configured to receive reference signals, control information and data from one or more other devices. For example, the transmitter 376 may transmit signaling, control information and data to, and the receiver 378 may receive signaling, control information and data from, the UE 115. In some implementations, the transmitter 376 and the receiver 378 may be integrated in one or more transceivers. Additionally or alternatively, the transmitter 376 or the receiver 378 may include or correspond to one or more components of the UE 115 described with reference to FIG. 2. In some implementations, the transmitter 376, the receiver 378, or both, may include or correspond to one or more interfaces. For example, the one or more interfaces may include a Uu-interface configured to enable communication with the base station 105 or a PC5 interface configured to enable communication with one or more UEs, such as the UEs 115, 360.

In some implementations, the wireless communications system 300 implements a 5G New Radio (NR) network or a V2X network. For example, the wireless communications system 300 may include multiple 5G-capable UEs 115 and multiple 5G-capable base stations 105, such as UEs and base stations configured to operate in accordance with a 5G NR network protocol such as that defined by the 3GPP. Additionally, the wireless communication system 300 may include or implement aspects of a 4G network, a 3G network, a 2G network, or a combination thereof.

During operation of the wireless communications system 300, the base station 105, such as a gNB, sends a grant message 386 to the UE 115, such as a PLC device. The grant message includes may include a DCI message, such as a single DCI having a DCI 3_0 format. In some implementations, the grant message includes a DG message or a CG message. Based on the grant message 386, the UE 115 may determine a set of sidelink resources, such as the sidelink resource information 306, that can be split into multiple subgroups for multiple unicast communication. For example, the UE 115 may split the set of sidelink resources into multiple subgroups based on the BSR information 308. The BSR information 308 may include or indicate an RX UE buffer status report, channel state information of an RX UE channel, or a combination thereof. The resource splitting by the UE 115 may be transparent to the base station 105, partially known to the base station 105, or indicated or controlled by the base station 105.

The UE 115 may schedule multiple unicast messages, and transmit the multiple unicast messages via the subgroups. For example, the UE 115 may transmit, to the first receive UE 360, a first message 390 of the multiple unicast messages via a first subgroup of the subgroups. Additionally, or alternatively, the UE 115 may transmit, to the second receive UE 370, a second message 392 of the multiple unicast messages via a second subgroup of the subgroups.

In some implementations, the UE 115 may receive feedback, such as an ACK/NACK (A/N), from an RX UE. To illustrate, the UE 115 may receive a first ACK/NACK message 394 from UE 360, a second ACK/NACK message from UE 370, or a combination thereof. Based on the received ACK/NACK message, the UE 115 may transmit a feedback message, such as A/N message 382, to the base station 105. The A/N message 382 may be responsive to the grant message 386. In some implementations, the A/N message 382 may be used, such as by the base station 105, to determine additional resources requested by the UE 115. The f A/N message 382 may be a single feedback message (corresponding to multiple ACKs/NACKs received by the UE 115) or multiple feedback messages (each feedback message corresponding to a different ACK/NACK message (394,396)). The A/N message 382 may include an ACK/NACK indicator, such as one or more bits 383. The one or more bits 383 may include a single bit or multiple bits. In some implementations, the feedback message includes an ACK/NACK indicator for each subgroup or an ACK/NACK indicator for each subgroup of a maximum number of subgroups. Additionally, or alternatively, the A/N message 382 may be configured to indicate, for the number of subgroups, a number of ACKs, a number of NACKS, or both. In some implementations, the ACK/NACK indicator includes multiple bits and a value of the multiple bits indicates or corresponds to an amount of resources requested by the UE 115.

In some implementations, the UE 115 may generate a buffer status for each of one or more RX UEs. The UE 115 may transmit one or more sidelink BSRs to the base station 105 to request sidelink resources. For example, the UE may send a sidelink BSR for each RX UE. Additionally, or alternatively, the UE 115 may combining the buffer status of multiple RX UEs to generate the sidelink BSR and send a sidelink BSR for the multiple RX UEs. The sideline BSR may correspond to a request for resources and enable the base station 105 to allocate the set of resources, determine a maximum number of subgroups, determine a number of subgroups of the set of resources, or a combination there. The number of subgroups may be less than or equal to the maximum number of subgroups. For example, the number of subgroups may be one subgroup. In some implementations, the base station 105 may indicate the maximum number of subgroups, the number of subgroups, or a combination thereof, in the grant message 386, in an RRC message 385, or a combination thereof.

In some implementations, the base station 105 allocates a set of resources to the UE 115 and the UE 115 divides or splits the set of resources into subgroups or channels according to the UE's need. The grant message 386 may be a single DCI that is transmitted to the UE 115 for the UE 115 to schedule multiple unicast messages, such as multiple unicast message for sidelink communications, such as sidelink communication to one or more sensor devices, actuator devices, or a combination thereof. In some implementations, the grant message 386 may include a DCI 3_0 format and may grant a set of resources.

In some implementations, a resource split by the UE 115 is transparent to the base station 105. For example, the base station 105 may not be aware of the SL resource splitting by the UE 115 and assumes the UE 115 is serving one Rx UE with the resource. The base station 105 may use the grant message 386, such as DCI 3_0, to grant the UE 115 a set of SL resources. To illustrate, the base station 105 may rants the resources through DCI 3_0 without knowing that the UE 115 is splitting the resources. The UE 115 can split the resources into smaller portions in order to serve multiple Rx UEs, such as UES 360, 370.

The UE 115 may perform BSR reporting by maintaining the buffer status, such as BSR information 308, for each Rx UE. The UE 115 may combines the BSRs of multiple RX UEs into a combined SL BSR when reporting to the base station 105 for a resource request.

The UE 115 may split the resources among its sidelinks and unicasts to its sidelinks using PSCCH, PSSCH, or a combination thereof. The resource splitting by the UE 115 may depend on or be per RX UE BSR, per RX UE channel, or a combination thereof. In some implementations, the splitting can be uneven or arbitrary. To illustrate, if the UE 115 has two sidelinks and one has better channel conditions (and the other channel has relatively worse channel conditions), the UE 115 may split the resources so that a majority of the resources are allocated to the poor sidelink and less than a majority of the resources are allocated to the good sidelink.

In some implementations, feedback reporting, such as A/N message 382 reporting, may include a single-bit, such as a single bit 838, (as the splitting is transparent to the base station 105, so only one bit it expected by the base station 105). From the UE 115 perspective, each Rx UE will report one A/N. The UE 115 may use an OR operation on multiple received ACKs or multiple received NACKs to generate the A/N message 382. In other words, if the UE 115 receives a single NACK, the UE 115 reports a NACK (indicating at least one of the Rx UE failed decoding) to the base station 105 to request additional resources. In some implementations, the feedback reporting may include a multi-bit A/N mechanism, such as multiple bits 383.

In some implementations, the UE 115 may use multiple bits for the PUCCH reporting. For example, the base station 105 may configure a variable number of bits (e.g., X) for PUCCH, which may be used to request additional resources. The X number of bits can be any number of bits. The variable number of may enable the UE 115 to indicate more information than just A/N reporting. The UE 115 may determine the X number of bits and transmit according to a format that indicates a resource request, such as resource request relative to a previous resource allocation received from the base station 105. As an illustrative, non-limiting example, if X=2, the value "11" corresponds to reporting ACK, the value "00" corresponds to reporting NACK and requesting additional resources (e.g., 150% more resources), the value "01" requests the same resources, and the value "10" requests 50% of resources. As X increases in number of bits, an overhead may be increased, but a resource request by the UE 115 may be more accurate and improve communication efficiency.

In some implementations, the base station 105 knows that the resource split is performed by the UE 115. For example, the base station 105 may be aware that the UE 115 may partition the granted resources into N subgroups, where N is a positive integer, but may not know exactly how many portions the UE 115 will split each subgroup into, and how many subchannels exist in each portion. The partition of set of resource into subgroups may be preconfigured or dynamically configured. To illustrate, the base station 105 may notify the UE 115 of the value of N. For example, the base station 105 may provide N in the RRC message 385. In some implementations, the value of N may also impact a feedback mechanism of the UE 115, as described further herein. The base station 105 may use the grant message 386, such as DCI 3_0, to grant the UE 115 a set of SL resources, which is partitioned into N. For example, the base station 105 may split the resources beforehand into bands of groups, but the UE 115 can split each band into smaller portions as needed. The UE 115 is responsible for controlling the further split into smaller portions for different RX UEs.

In some implementations, for BSR reporting, the UE 115 maintains the BSR information 308 for each Rx UE, such as UE 360, 370, and reports multiple BSRs to the base station 105. The base station 105 combines the BSRs for resource allocation, assuming that the UE 115 will do resource splitting. To illustrate, the UE 115 may maintain the BSR information 308 for each RX UE and reports multiple BSRs to the base station 105 so the base station 105 can combine the reports for a resource allocation determination. In some implementations, the UE 115 maintains the BSR information 308 for each Rx UE but combines the BSRs to generate a combined SL BSR when reporting to base station 105 for resource request. The base station 105 understands the combined BSR and the UE 115 may split the resources further.

In some implementations, the base station 105 may configure the maximum number of subgroups the resource can be split into equals N and that PUCCH will also include N bits. To illustrate, each bit may corresponds to one subgroup of resources and may be assigned a value for the PSFCH A/N from that transmission to this bit location. If any subgroup was not used by the UE 115 (e.g., the UE 115 only used M out of N subgroups, where M<N), the UE 115 UE set the corresponding bit(s) to indicate ACKs. In another implementation, the N bits may be used to indicate a number of ACK or a number of NACKs of a total N. By providing the number of ACKs or the number of NACKs—e.g., by reporting a proportion of a total, the base station 105 may determine an additional amount of resources to be granted for retransmission. In some implementation, the N bits may be used by the UE 115 according to a format (as described above) that indicates a resource request, such as resource request relative to a previous resource allocation received from the base station 105.

In some implementations, the resource split by the UE 115 may be controlled or directed by the base station 105. To illustrate, the UE 115 may be unable to further split resources into smaller subgroups. For example, the base station 105 may use the grant message 386, such as DCI 3_0, to grant the UE 115 a set of SL resources and to control how the resources are split into subgroups dynamically in the grant message 386 (e.g., the DCI 3_0). The UE 115 is prohibited from a further split the resources in each subgroup.

In some implementations, the grant message 386, such as DCI 3_0, may include a HARQ process ID field that indicates the HARQ ID of the first subgroup. The remaining splits (e.g., remaining subgroups) may increment HARQ ID with wrap around to determine a corresponding value. Regarding the wrap around, the first value may be "000", the eighth subgroup would have a value of "111", and the ninth subgroup would be "000" based on the wrap around.

In some implementations, the grant message 386 may indicate a number of splits, such as a number of subgroups. The number of splits may be less than or equal to a maximum number of splits (e.g., a maximum number of subgroups). The maximum number of subgroups may be a default value, such as a value set by a standard, or a dynamic value, such as a value set by the UE 115 or the base station 105. The maximum of subgroups, the number of allocated subgroups, or both, may be indicated in the grant message 386 or in an RRC message 385, as illustrate, non-limiting examples.

In some implementations, NDI control can be introduced for each of the subgroups, which may allow mixed NDIs for each transmission. Alternatively, a common NDI for all subgroups. To illustrate NDI control, the base station 105 may allocate resources and provide an NDI control indication, such as included in the grant message 386 or the RRC message 385, as illustrative, non-limiting examples. The NDI control indication may be set to force or cause the UE 115 to transmit a new packet/new message. For example, the NDI control indication can override an existing scheduling mechanism. If a common NDI is used for multiple subgroups and the base station 105 wants the UE 115 to send a new message, then the UE 115 drop all existing and send new messages.

In some implementations, for BSR reporting, the UE 115 maintains the BSR information 308 for each Rx UE and reports multiple BSRs to base station 105. The base station manages the resources (e.g., for resource splitting) based on any by taking into consideration the received BSRs.

In some implementations, the UE 115 may perform feedback reporting, such transmit A/N message 382, per-split (e.g. per subgroup). The UE 115 may provide feedback reporting using a same number of bits as the number of allocated subgroups, or a different number of bits as the number of allocates subgroups. When the same number is used, the UE 115 may map the PSFCH A/N to each of the bits. The base station 105 may be configured to determine a feedback based on the one or more bits and to use the determined feedback for resource planning and NDI control.

In some implementations, the UE 115 may receive, from the base station 105, the grant message 386 indicating a set of sidelink resources. The UE 115 may transmit multiple unicast messages via multiple subgroups of the set of sidelink resources. To illustrate, in some implementations, the UE 115 may configure multiple subgroups of the set of sidelink resources and may transmit the multiple unicast messages via each subgroup of the multiple subgroups. Additionally, or alternatively, the UE 115 may determine, based on the grant message 386, the set of sidelink resources and may split the set of sidelink resources into the multiple subgroups.

As described with reference to FIG. 6, the present disclosure provides techniques for sidelink resources scheduling for unicast messaging operations. For example, the UE 115 may receive a set of resource from the base station 105 and may divide and allocate portions of the set of resources according to a need of the UE 115. For example, the UE 115 may use different portions to send unicast messages to different RX UEs, such as UEs 360, 370. Accordingly, the techniques described herein may enable a single grant message, such as a single DCI (e.g., a DCI having a DCI 3_0 format) to be used for the UE 115 to schedule multiple unicast message. By scheduling and transmitting multiple unicast message, such as the messages 390, 392, responsive to one grant message, such as the grant message 386, an amount of overhead message is reduced as compared to convention techniques, such as V2X messaging techniques.

FIG. 7 is a flow diagram illustrating an example process 700 that supports sidelink resources scheduling for unicast messaging according to some aspects. Operations of the process 700 may be performed by a UE, such as the UE 115 described above with reference to FIG. 1, 2, or 6, the UE 115*n* of FIG. 4, or the UE 115*k* of FIG. 5. For example, example operations (also referred to as "blocks") of the process 700 may enable the UE to perform sidelink resources scheduling for unicast messaging.

In block 702, the UE determines, based on a grant message received from a base station, a set of sidelink resources. In some implementations, the base station includes a gNB; the UE includes a programmable logic controller; or a combination thereof. The grant message may include or correspond to the grant message 386. For example, grant message may be a single grant message. The grant message grant message may include DCI, such as a single DCI. The DCI may have a DCI 3_0 format. Additionally, or alternatively the grant message may include a DG message or a CG message. the grant message includes a. The set of sidelink resources may include or correspond to the split information 387, the SL resource information 306, or a combination thereof.

In block 704, the UE splits the set of sidelink resources into multiple subgroups. The UE may split the set of sidelink resources based on a RX UE buffer status report, channel state information of an RX UE channel, or a combination thereof. In some implementations, after splitting the set of sidelink resources, the UE may the multiple unicast messages to be sent to multiple RX UEs, such as the UEs 360, 370 of FIG. 3.

In block 706, the UE transmits multiple unicast messages via the subgroups. The unicast messages may include or correspond to messages 390, 392. For example, the UE may transmit, to a first RX UE, a first unicast message of the multiple unicast messages via a first subgroup of the subgroups, and transmit, to a second receive UE, a second unicast message of the multiple unicast messages via a second subgroup of the subgroups. The first subgroup may include a different band or channel from the second subgroup.

In some implementations, the UE may receive a first ACK/NACK message from the first RX UE responsive to the first unicast message. Additionally, or alternatively, the UE may receive a second ACK/NACK message from the second RX UE responsive to the second unicast message. The first and second ACK/NACK messages may include or correspond to the A/N messages 394, 396.

In some implementations, the UE may generate a feedback message. The UE may transmit the feedback message to the base station. For example, the feedback message may include or correspond to the ACK/NACK message 382. For example, the feedback message indicates, for the number of subgroups, a number of ACKs, a number of NACKS, or both. The feedback message may be responsive to the grant message, may be a single feedback message, or a combination thereof. Additionally, or alternatively, the feedback message may include a number of ACK/NACK indicators, such as one or more ACK/NACK indicators. The ACK/NACK indicator may include a single bit or multiple bits. The one or more ACK/NACK indicators may include or correspond to the bit 383. The feedback message may include an ACK/NACK indicator for each subgroup. In some implementations, the feedback message includes an ACK/NACK indicator for each subgroup of a maximum number of subgroups.

In some implementations, the feedback message includes an ACK/NACK indicator having multiple bits. The UE may an amount of resources to be requested from the base station, and determine a value of the multiple bits based on the amount.

In some implementations, the UE determines a maximum number of subgroups that the set of resources are splittable into. For example, the UE may receive a RRC message that indicates the maximum number of subgroups. Accordingly, the UE may determine the maximum number of subgroups based on the RRC message. The RRC message may include or correspond to the RRC message 385. Additionally, or alternatively, the UE may determine a number of subgroups to split the set of resources into. The number of subgroups is less than or equal to the maximum number of subgroups. In some implementations, the number of subgroups is equal to one.

In some implementations, the UE may generate or maintain a buffer status for each of one or more RX UEs. The buffer status may include or correspond to the BSR information 308. The UE may transmit the a sidelink BSR to the base station to request sidelink resources. The sideline BSR may be generated based on the BSR information 308. In some implementations, the UE may combine the buffer status of multiple RX UEs to generate the sidelink BSR.

In some implementations, the UE may determine, based on a HARQ process ID field of the grant message, a HARQ ID of a first subgroup of the set of sidelink resources. For example, the grant message indicates a number of one or more subgroups of the set of sidelink resources. The number of one or more subgroups may be included in or indicated by the split information 387. The UE may determine the number of one or more subgroups of the set of sidelink resources. The number of one or more subgroups of the set of sidelink resources is less than or equal to a maximum number of subgroups the set of sidelink resources is splittable into. Additionally, or alternatively, the UE may identify a NDI control of the grant message. The NDI control may be used for multiple subgroups. In some implementations, each subgroup is associated with a NDI control of the grant message.

Thus, FIG. 7 describes techniques and potential advantages for sidelink resources scheduling for unicast messaging. For example, the UE may receive a set of resource from a base station and may divide and allocate portions of the set of resources according to a need of the UE. For example, the UE may use different portions to send unicast messages to different RX UEs. Accordingly, the techniques described herein may enable a single grant message, such as a single DCI (e.g., a DCI having a DCI 3_0 format) to be used for the UE to schedule multiple unicast message. By scheduling and transmitting multiple unicast message responsive to one grant message, an amount of overhead message is reduced as compared to convention techniques, such as V2X messaging techniques.

FIG. 8 is a flow diagram illustrating an example process 800 that supports sidelink resources scheduling for unicast messaging according to some aspects. Operations of the process 800 may be performed by a UE, such as the UE 115 described above with reference to FIG. 1, 2, or 6, the UE 115*n* of FIG. 4, or the UE 115*k* of FIG. 5. For example, example operations (also referred to as "blocks") of the process 800 may enable the UE to perform sidelink resources scheduling for unicast messaging.

In block 802, the UE receives, from a base station, a grant message indicating a set of sidelink resources. The base station may include or correspond to the base station 105. The grant message may include or correspond to the grant message 386. For example, grant message may be a single grant message. The grant message grant message may include DCI, such as a single DCI. The DCI may have a DCI 3_0 format. Additionally, or alternatively the grant message may include a DG message or a CG message. the grant message includes a. The set of sidelink resources may include or correspond to the split information 387, the SL resource information 306, or a combination thereof.

In block 804, the UE transmits multiple unicast messages via multiple subgroups of the set of sidelink resources. Additionally, to transmit the multiple unicast messages, the UE may transmit the multiple unicast messages via each subgroup of the multiple subgroups. In some implementations, the UE may the multiple unicast messages to be sent to multiple RX UEs, such as the UEs 360, 370 of FIG. 3.

In some implementations, the UE may configure multiple subgroups of the set of sidelink resources. Additionally, or alternatively, the UE may determine, based on the grant message, the set of sidelink resources, and split the set of sidelink resources into the multiple subgroups.

Figure 9:
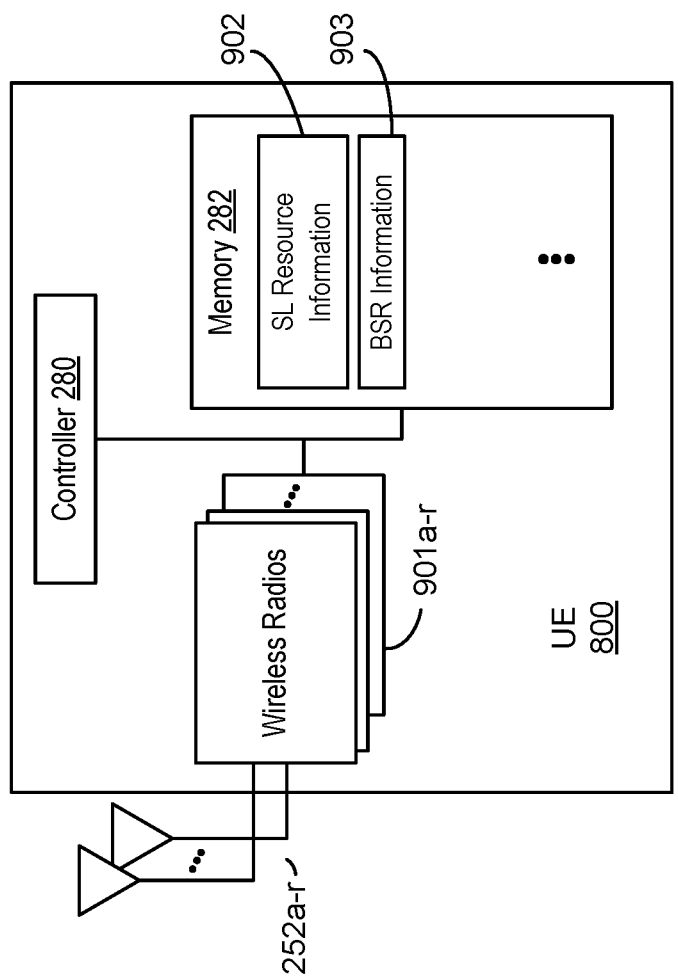
FIG. 9 is a block diagram of an example UE that supports sidelink resources scheduling for unicast messaging according to some aspects.

FIG. 9 is a block diagram of an example UE 900 that supports sidelink resources scheduling for unicast messaging according to some aspects. The UE 900 may be configured to perform operations, including the blocks of the process 700 or the process 800 described with reference to FIGS. 7 and 8, to perform sidelink resources scheduling for unicast messaging. In some implementations, the UE 900 includes the structure, hardware, and components shown and described with reference to the UE 115 of FIG. 1, 2, or 6, the UE 115*n* of FIG. 4, or the UE 115*k* of FIG. 5. For example, the UE 900 includes the controller 280, which operates to execute logic or computer instructions stored in the memory 282, as well as controlling the components of the UE 900 that provide the features and functionality of the UE 900. The UE 900, under control of the controller 280, transmits and receives signals via wireless radios 901*a-r* and the antennas 252*a-r*. The wireless radios 901*a-r* include various components and hardware, as illustrated in FIG. 2 for the UE 115, including the modulator and demodulators 254a-r, the MIMO detector 256, the receive processor 258, the transmit processor 264, and the TX MIMO processor 266. In some implementations, the wireless radios 901a-r may include or correspond to one or more interfaces, such as a Uu-interface, a PC5 interface, or a combination thereof.

As shown, the memory 282 may include SL resource information 902, and BSR information 903. The SL resource information 902 and the BSR information 903 may include or correspond to the SL resource information 306 and the BSR information 308, respectively. The UE 900 may receive signals from or transmit signals to one or more network entities, such as the base station 105 of FIG. 1, 2, or 6, the base station 105f of FIG. 4, the base station 105e of FIG. 5, the UE 115 of FIG. 1, 2, or 6, the UE 115f, 115m, 115n of FIG. 4, the UE 115k, 115j of FIG. 5, the UE 360, 370 of FIG. 6, or a base station as illustrated in FIG. 10.

Figure 10:
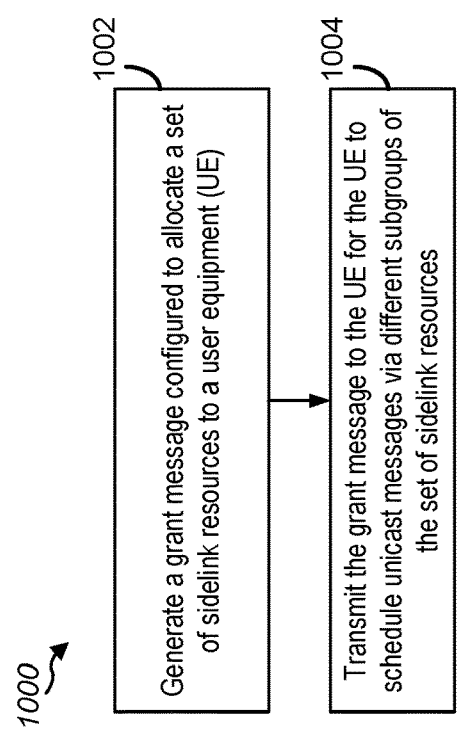
FIG. 10 is a flow diagram illustrating an example process that supports sidelink resources scheduling for unicast messaging operations according to some aspects.

FIG. 10 is a flow diagram illustrating an example process 1000 that supports sidelink resources scheduling for unicast messaging according to some aspects. Operations of the process 1000 may be performed by a base station, such as the base station 105 of FIG. 1, 2, or 6, the base station 105f of FIG. 4, the base station 105e of FIG. 5. For example, example operations (also referred to as "blocks") of the process 1000 may enable the base station to perform sidelink resources scheduling for unicast messaging.

In block 1002, the base station generating a grant message configured to allocate a set of sidelink resources to a UE. In some implementations, the base station includes a gNB, the UE includes a programmable logic controller, or a combination thereof. The grant message may include or correspond to the grant message 386. The grant message may be a single grant message. Additionally, or alternatively, the grant message may include DCI, such as a single DCI—e.g., a DCI 3_0 format. In some implementations, the grant message includes a DG message or a CG message. The set of sidelink resources may include or be indicated by the split information 387.

In block 1004, the base station transmitting the grant message to the UE for the UE to schedule unicast messages via different subgroups of the set of sidelink resources. The UE may include or correspond to UE 115 of FIG. 3.

In some implementations, the base station may the base station is unaware of sidelink resource splitting implemented by the UE. The base station may receive a feedback message from the UE. The feedback message may include or correspond to the ACK/NACK message 382. The feedback message may be responsive to the grant message, the feedback message may be a single feedback message; or a combination thereof. Additionally, or alternatively, the feedback message may include an ACK/NACK indicator. The ACK/NACK indicator may include or correspond to the one or more bits 383, such as a single bit or multiple bits. In some implementations, when the ACK/NACK indicator includes multiple bits, the base station may determine a value of the multiple bits, and determine an amount of resources requested by the UE based on the value.

In some implementations, the base station is partially aware of sidelink resource splitting implemented by the UE. The set of sidelink resources include one or more subgroups and the base station may receive one or more feedback messages from the UE responsive to the grant message. Additionally, or alternatively, the base station may transmit an RRC message to the UE. The RRC may include or correspond to the RRC message 385. The RRC message may indicate a number of subgroups the set of sidelink resources is splittable into. In some implementations, the base station may receive a feedback message, such as the ACK/NACK message 382, from the UE. The feedback message may include a number of ACK/NACK indicators. For example, the feedback message may include an ACK/NACK indicator for each subgroup. Additionally, or alternatively, the feedback message may indicate, for the number of subgroups, a number of ACKs, a number of NACKS, or both. In some implementations, the ACK/NACK indicator includes multiple bits and the base station may determine an amount of resources requested by the UE based on a value of the multiple bits.

In some implementations, sidelink resource splitting of the set of sidelink resources is controlled by the base station. For example, a HARQ process ID field of the grant message may indicate a HARQ ID of a first subgroup of the set of sidelink resources. Additionally, or alternatively, the grant message may indicate a number of one or more subgroups of the set of sidelink resources. The number of one or more subgroups of the set of sidelink resources may be less than or equal to a maximum number of subgroups the set of sidelink resources is splittable into. In some implementations, the base station may transmit an RRC message to the UE. The RRC message, such as the RRC message 385, may indicate the maximum number of subgroups. In some implementations, a NDI control, such as a single NDI control, of the grant message may be used used for multiple subgroups. Alternatively, a NDI control of the grant message is used for a single subgroup. In some implementations, the base station receive a feedback message, such as the ACK/NACK message 382, from the UE. The feedback message may include a number of ACK/NACK indicators, such as one or more ACK/NACK indicators. For example, the feedback message may include an ACK/NACK indicator for each subgroup.

Thus, FIG. 10 describes techniques and potential advantages for sidelink resources scheduling for unicast messaging. For example, the base station may send a grant message that indicates a set of resources, such as sidelink resources, for the UE to use for sidelink communications, such as unicast messages. The grant message may enable or cause the UE to divide and allocate portions of the set of resources according to a need of the UE. For example, TX UE may use different portions to send unicast message to different RX UEs. Accordingly, the techniques described herein may enable a single grant message, such as a single DCI (e.g., a DCI having a DCI 3_0 format) to be used for the UE to schedule multiple unicast message. By scheduling and transmitting multiple unicast message responsive to one grant message, an amount of overhead message is reduced as compared to convention techniques, such as V2X messaging techniques.

Figure 11:
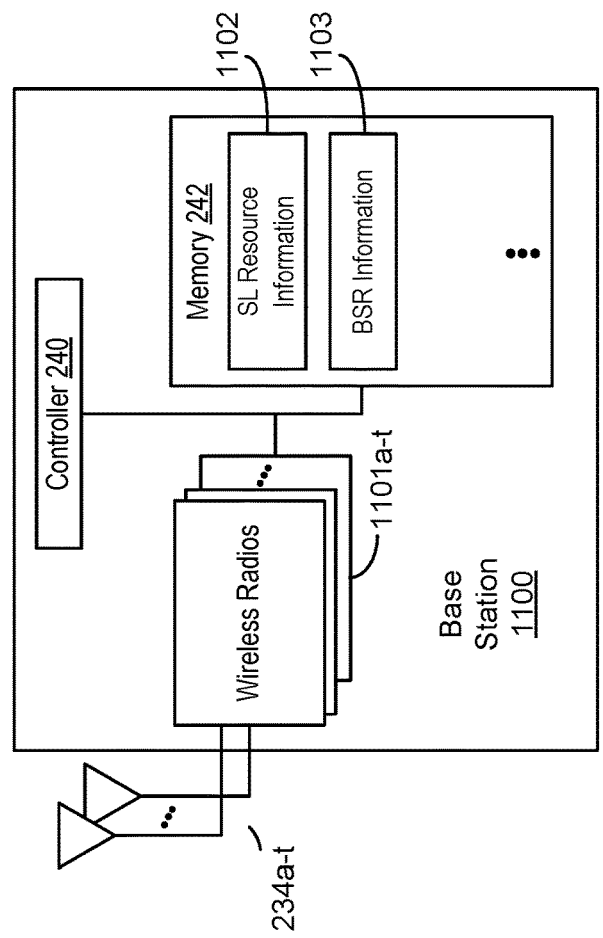
FIG. 11 is a block diagram of an example base station that supports sidelink resources scheduling for unicast messaging operations according to some aspects.

FIG. 11 is a block diagram of an example base station 1100 that supports sidelink resources scheduling for unicast messaging according to some aspects. In some implementations, the base station 1100 includes the structure, hardware, and components shown and described with reference to the base station 105 of FIG. 1, 2, or 6, the base station 105f of FIG. 4, the base station 105e of FIG. 5. For example, the base station 1100 may include the controller 240, which operates to execute logic or computer instructions stored in the memory 242, as well as controlling the components of the base station 1100 that provide the features and functionality of the base station 1100. The base station 1100, under control of the controller 240, transmits and receives signals via wireless radios 1101a-t and the antennas 234a-t. The wireless radios 1101a-t include various components and hardware, as illustrated in FIG. 2 for the base station 105, including the modulator and demodulators 232a-t, the transmit processor 220, the TX MIMO processor 230, the MIMO detector 236, and the receive processor 238. In some implementations, the wireless radios 1101a-t may include or correspond to one or more interfaces, such as a Uu-interface.

As shown, the memory 242 may include SL resource information 1102, and BSR information 1103. The SL resource information 1102 and the BSR information 1103 may include or correspond to the SL resource information 306 and the BSR information 308, respectively. The base station 1100 may receive signals from or transmit signals to one or more UEs, such as the UE 115 of FIG. 1, 2, or 6, the UE 115f, 115m, 115n of FIG. 4, the UE 115k, 115j of FIG. 5, the UE 360, 370 of FIG. 6.

It is noted that one or more blocks (or operations) described with reference to FIG. 7, 8, or 10 may be combined with one or more blocks (or operations) described with reference to another of the figures. For example, one or more blocks (or operations) of FIG. 7 may be combined with one or more blocks (or operations) of FIG. 10. As another example, one or more blocks associated with FIG. 7 may be combined with one or more blocks (or operations) associated with FIG. 8. As another example, one or more blocks associated with FIG. 7 or 8 may be combined with one or more blocks (or operations) associated with FIG. 2, 4, 5, or 6. As another example, one or more blocks associated with FIG. 10 may be combined with one or more blocks (or operations) associated with FIG. 2, 4, 5, or 6. Additionally, or alternatively, one or more operations described above with reference to FIGS. 1-11 may be combined with one or more operations described with reference to another of FIGS. 1-11.

In some aspects, techniques for enabling sidelink resources scheduling for unicast messaging may include additional aspects, such as any single aspect or any combination of aspects described below or in connection with one or more other processes or devices described elsewhere herein. In a first aspect, performing sidelink resources scheduling for unicast messaging may include an apparatus configured to determine, based on a grant message received from a base station, a set of sidelink resources. The apparatus may also be configured to split the set of sidelink resources into multiple subgroups, and transmit multiple unicast messages via the subgroups. In some examples, the techniques in the first aspect may be implemented in a method or process. In some other examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a second aspect, in combination with the first aspect, the set of sidelink resources are split based on a RX UE buffer status report, channel state information of an RX UE channel, or a combination thereof.

In a third aspect, in combination with the first aspect or the second aspect, the apparatus is configured to schedule the multiple unicast messages.

In a fourth aspect, in combination with the third aspect, to transmit the multiple unicast messages, the apparatus is further configured to transmit, to a first receive UE, a first unicast message of the multiple unicast messages via a first subgroup of the subgroups, to transmit the multiple unicast messages, the apparatus is further configured to transmit, to a second receive UE, a second unicast message of the multiple unicast messages via a second subgroup of the subgroups.

In a fifth aspect, in combination with one or more of the first through fourth aspects, the apparatus is configured to receive a first ACK/NACK message from the first RX UE responsive to the first unicast message.

In a sixth aspect, in combination with the fifth aspect, the apparatus is configured to receive a second ACK/NACK message from the second RX UE responsive to the second unicast message.

In a seventh aspect, in combination with one or more of the first through sixth aspects, the apparatus is configured to generate a buffer status for each of one or RX UEs.

In an eighth aspect, in combination with the seventh aspect, the apparatus is configured to transmit a sidelink BSR to the base station to request sidelink resources.

In a ninth aspect, in combination with one or more of the first through eighth aspects, the apparatus is configured to combine the buffer status of multiple RX UEs to generate the sidelink BSR.

In a tenth aspect, in combination with one or more of the first through ninth aspects, the apparatus is configured to transmit a feedback message to the base station.

In an eleventh aspect, in combination with the tenth aspect, the feedback message is responsive to the grant message; the feedback message is a single feedback message; or a combination thereof.

In a twelfth aspect, in combination with one or more of the tenth or eleventh aspects, the feedback message includes an ACK/NACK indicator.

In a thirteenth aspect, in combination with the twelfth aspect, the ACK/NACK indicator is a single bit.

In a fourteenth aspect, in combination with the twelfth aspect, the ACK/NACK indicator includes multiple bits.

In a fifteenth aspect, in combination with the fourteenth aspect, the apparatus is configured to determine an amount of resources to be requested from the base station.

In a sixteenth aspect, in combination with the fifteenth aspect, the apparatus is configured to determine a value of the multiple bits based on the amount.

In a seventeenth aspect, in combination with one or more of the first through sixteenth aspects, the apparatus is configured to determine a maximum number of subgroups that the set of resources are splittable into.

In an eighteenth aspect, in combination with the seventeenth aspect, the apparatus is configured to receive an RRC message.

In a nineteenth aspect, in combination with the eighteenth aspect, the maximum number of subgroups determined based on the RRC message.

In a twentieth aspect, in combination with one or more of the seventeenth through nineteenth aspects, the apparatus is configured to determine a number of subgroups to split the set of resources into.

In a twenty-first aspect, in combination with one or more of the twentieth aspect, the number of subgroups is less than or equal to the maximum number of subgroups.

In a twenty-second aspect, in combination with one or more of the first through twenty-first aspects, the apparatus is configured to generate a feedback message.

In a twenty-third aspect, in combination with one or more of the first through twenty-second aspects, the apparatus is configured to transmit the feedback message to the base station.

In a twenty-fourth aspect, in combination with the twenty-third aspect, the feedback message includes a number of ACK/NACK indicators.

In a twenty-fifth aspect, in combination with one or more of the twenty-second through twenty-fourth aspects, the feedback message includes an ACK/NACK indicator for each subgroup.

In a twenty-sixth aspect, in combination with one or more of the twenty-second through twenty-fourth aspects, the feedback message includes an ACK/NACK indicator for each subgroup of a maximum number of subgroups.

In a twenty-seventh aspect, in combination with the twenty-third aspect, the feedback message indicates, for the number of subgroups, a number of ACKs, a number of NACKS, or both.

In a twenty-eighth aspect, in combination with the twenty-third aspect, the feedback message includes an ACK/NACK indicator, and the ACK/NACK indicator includes multiple bits.

In a twenty-ninth aspect, in combination with the twenty-eighth aspect, the apparatus is configured to determine a value of the multiple bits.

In a thirtieth aspect, in combination with the twenty-ninth aspect, the apparatus is configured to determine an amount of resources requested by the UE based on the value.

In a thirty-first aspect, in combination with one or more of the first through eighth aspects, the apparatus is configured to determine, based on a HARQ process ID field of the grant message, a HARQ ID of a first subgroup of the set of sidelink resources.

In a thirty-second aspect, in combination with one or more of the first through eighth aspects or the fourteenth aspect, the grant message indicates a number of one or more subgroups of the set of sidelink resources.

In a thirty-third aspect, in combination with the thirty-second aspect, the apparatus is configured to determine the number of one or more subgroups of the set of sidelink resources.

In a thirty-fourth aspect, in combination with the thirty-third aspect, the number of one or more subgroups of the set of sidelink resources is less than or equal to a maximum number of subgroups the set of sidelink resources is splittable into.

In a thirty-fifth aspect, in combination with one or more of the thirty-third through thirty-fourth aspects, the apparatus is configured to receive an RRC message.

In a thirty-sixth aspect, in combination with the thirty-fifth aspect, the RRC message indicates the maximum number of subgroups.

In a thirty-seventh aspect, in combination with one or more of the first through eighth aspect or the fourteenth through thirty-sixth aspects, an NDI control of the grant message is used for multiple subgroups.

In a thirty-eighth aspect, in combination with one or more of the first through eighth aspects or the fourteenth through thirty-sixth aspects, each subgroup is associated with an NDI control of the grant message.

In a thirty-ninth aspect, in combination with one or more of the first through eighth aspects or the fourteenth through thirty-eighth aspects, the apparatus is configured to transmit a feedback message to the base station.

In a fortieth aspect, in combination with the thirty-ninth aspect, the feedback message to include a number of ACK/NACK indicators, or the feedback message includes an ACK/NACK indicator for each subgroup.

In a forty-first aspect, in combination with one or more of the first through fortieth aspects, the grant message is a single grant message.

In a forty-second aspect, in combination with one or more of the first through forty-first aspects, the grant message grant message includes DCI.

In a forty-third aspect, in combination with the forty-second aspect, the grant message includes a single DCI.

In a forty-fourth aspect, in combination with one or more of the first through forty-third aspects, the grant message includes a DG message or a CG message.

In a forty-fifth aspect, in combination with one or more of the first through forty-third aspects, the grant message includes a DCI 3_0 format.

In a forty-sixth aspect, in combination with one or more of the first through forty-fifth aspects, the base station includes a gNB; the UE includes a programmable logic controller; or a combination thereof.

In some aspects, techniques for enabling sidelink resources scheduling for unicast messaging may include additional aspects, such as any single aspect or any combination of aspects described below or in connection with one or more other processes or devices described elsewhere herein. In a forty-seventh aspect, techniques for enabling sidelink resources scheduling for unicast messaging may include an apparatus configured for wireless communication, such as a base station, that is configured to generate a grant message configured to allocate a set of sidelink resources to a UE, and transmit the grant message to the UE for the UE to schedule unicast messages via different subgroups of the set of sidelink resources. In some examples, the techniques in the first aspect may be implemented in a method or process. In some other examples, the techniques of the first aspect may be implemented in a wireless communication device such as a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a forty-eighth aspect, in combination with the forty-seventh aspect, the base station is unaware of sidelink resource splitting implemented by the UE.

In a forty-ninth aspect, in combination with the forty-seventh or forty-eighth aspect, the apparatus is configured to receive a feedback message from the UE.

In a fiftieth aspect, in combination with the forty-ninth aspect, the feedback message is responsive to the grant message; the feedback message is a single feedback message; or a combination thereof.

In a fifty-first aspect, in combination with one or more of the forty-seventh through forty-ninth aspect, the feedback message includes an ACK/NACK indicator.

In a fifty-second aspect, in combination with the fifty-first aspect, the ACK/NACK indicator is a single bit.

In a fifty-third aspect, in combination with the fifty-first aspect, the ACK/NACK indicator includes multiple bits.

In a fifty-fourth aspect, in combination with the fifty-third aspect, the apparatus is configured to determine a value of the multiple bits.

In a fifty-fifth aspect, in combination with the fifty-third aspect, the apparatus is configured to determine an amount of resources requested by the UE based on the value.

In a fifty-sixth aspect, in combination with the forty-seventh aspect, the base station is partially aware of sidelink resource splitting implemented by the UE.

In a fifty-seventh aspect, in combination with the fifty-sixth aspect, the set of sidelink resources include one or more subgroups.

In a fifty-eighth aspect, in combination with one or more of the forty-seventh or fifty-sixth through fifty-fifth aspects, the apparatus is configured to receive one or more feedback messages from the UE responsive to the grant message.

In a fifty-ninth aspect, in combination with one or more of the forty-seventh through fifty-eighth aspects, the apparatus is configured to transmit an RRC message to the UE.

In a sixtieth aspect, in combination with the fifty-ninth aspect, the RRC message indicates a number of subgroups the set of sidelink resources is splittable into.

In a sixty-first aspect, in combination with one or more of the fifty-ninth through sixtieth aspects, the apparatus is configured to receive a feedback message from the UE.

In a sixty-second aspect, in combination with the sixty-first aspect, the feedback message includes a number of ACK/NACK indicators.

In a sixty-third aspect, in combination with one or more of the sixty-first through sixty-second aspects, the feedback message includes an ACK/NACK indicator for each subgroup.

In a sixty-fourth aspect, in combination with the sixty-first aspect, the feedback message indicates, for the number of subgroups, a number of ACKs, a number of NACKS, or both.

In a sixty-fifth aspect, in combination with the sixty-first aspect, the feedback message includes an ACK/NACK indicator, and the ACK/NACK indicator includes multiple bits.

In a sixty-sixth aspect, in combination with the sixty-fifth aspect, the apparatus is configured to determine a value of the multiple bits; and In a sixty-seventh aspect, in combination with the sixty-sixth aspect, the apparatus is configured to determine an amount of resources requested by the UE based on the value.

In a sixty-eighth aspect, in combination with the forty-seventh aspect, sidelink resource splitting of the set of sidelink resources is controlled by the base station.

In a sixty-ninth aspect, in combination with the sixty-eighth aspect, a HARQ process ID field of the grant message indicates a HARQ ID of a first subgroup of the set of sidelink resources.

In a seventieth aspect, in combination with one or more of the sixty-eighth through sixty-ninth aspects, the grant message indicates a number of one or more subgroups of the set of sidelink resources.

In a seventy-first aspect, in combination with the seventieth aspect, the number of one or more subgroups of the set of sidelink resources is less than or equal to a maximum number of subgroups the set of sidelink resources is splittable into.

In a seventy-second aspect, in combination with one or more of the seventieth through seventy-first aspects, the apparatus is configured to transmit a radio resource control (RRC) message to the UE.

In a seventy-third aspect, in combination with one or more of the seventieth through seventy-second aspects, the RRC message indicates the maximum number of subgroups.

In a seventy-fourth aspect, in combination with one or more of the seventieth through seventy-third aspects, an NDI control of the grant message is used for multiple subgroups.

In a seventy-fifth aspect, in combination with one or more of the seventieth through seventy-third aspects, an NDI control of the grant message is used for each subgroups.

In a seventy-sixth aspect, in combination with one or more of the seventieth through seventy-fifth aspects, the apparatus is configured to receive a feedback message from the UE.

In a seventy-seventh aspect, in combination with the seventy-sixth aspect, the feedback message includes a number of ACK/NACK indicators.

In a seventy-eighth aspect, in combination with the seventy-sixth aspect, the feedback message includes an ACK/NACK indicator for each subgroup.

In a seventy-ninth aspect, in combination with one or more of the forty-seventh through seventy-eighth aspects, the base station includes a gNB, the UE includes a programmable logic controller, or a combination thereof.

In an eightieth aspect, in combination with one or more of the forty-seventh through seventy-ninth aspects, the grant message is a single grant message.

In an eighty-first aspect, in combination with one or more of the forty-seventh through eightieth aspects, the grant message grant message includes DCI.

In an eighty-second aspect, in combination with the eighty-first aspect, the grant message includes a single DCI.

In an eighty-third aspect, in combination with one or more of the forty-seventh through eighty-second aspects, the grant message includes a DG message or a CG message.

In an eighty-fourth aspect, in combination with one or more of the forty-seventh through eighty-second aspects, the grant message includes a DCI 3_0 format.

In some aspects, techniques for enabling sidelink resources scheduling for unicast messaging may include additional aspects, such as any single aspect or any combination of aspects described below or in connection with one or more other processes or devices described elsewhere herein. In an eighty-fifth aspect, performing sidelink resources scheduling for unicast messaging may include an apparatus configured to receive, from a base station, a grant message indicating a set of sidelink resources. The apparatus may also be configured to transmit multiple unicast messages via multiple subgroups of the set of sidelink resources. In some examples, the techniques in the first aspect may be implemented in a method or process. In some other examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In an eighty-sixth second aspect, in combination with the eighty-fifth aspect, the apparatus is configured to configure multiple subgroups of the set of sidelink resources.

In an eighty-seventh aspect, in combination with one or more of the eighty-fifth aspect or the eighty-sixth aspect, to transmit the multiple unicast messages via the multiple subgroups, the apparatus is further configured to initiate transmission of the multiple unicast messages via each subgroup of the multiple subgroups.

In an eighty-eighth aspect, in combination with one or more of the eighty-fifth aspect through eighty-seventh aspects, the apparatus is configured to determine, based on the grant message, the set of sidelink resources, and split the set of sidelink resources into the multiple subgroups.

In an eighty-ninth aspect, in combination with the eighty-eighth aspect, the set of sidelink resources are split based on an RX UE buffer status report, channel state information of an RX UE channel, or a combination thereof.

In a ninetieth aspect, in combination with one or more of the eighty-fifth aspect through eighty-ninth aspects, the apparatus is configured to schedule the multiple unicast messages.

In a ninety-first aspect, in combination with the ninetieth aspect, to transmit the multiple unicast messages, the apparatus is configured to transmit, to a first receive UE, a first unicast message of the multiple unicast messages via a first subgroup of the subgroups, and transmit, to a second receive UE, a second unicast message of the multiple unicast messages via a second subgroup of the subgroups.

In a ninety-second aspect, in combination with one or more of the eighty-fifth aspect through ninety-first aspects, the apparatus is configured to receive a first ACK/NACK message from the first RX UE responsive to the first unicast message, and receive a second ACK/NACK message from the second RX UE responsive to the second unicast message.

In a ninety-third aspect, in combination with one or more of the eighty-fifth aspect through ninety-second aspects, the apparatus is configured to generate a buffer status for each of one or more RX UEs, and transmit a sidelink BSR to the base station to request sidelink resources.

In a ninety-fourth aspect, in combination with the ninety-third aspect, the apparatus is configured to combine the buffer status of multiple RX UEs to generate the sidelink BSR.

In a ninety-fifth aspect, in combination with one or more of the eighty-fifth aspect through ninety-fourth aspect, the apparatus is configured to transmit a feedback message to the base station.

In a ninety-sixth aspect, in combination with the ninety-fifth aspect, the feedback message is responsive to the grant message, the feedback message is a single feedback message, or a combination thereof.

In a ninety-seventh aspect, in combination with the ninety-fifth aspect, the feedback message includes an ACK/NACK indicator, and the ACK/NACK indicator includes one or more bits.

In a ninety-eighth aspect, in combination with the ninety-seventh aspect, the feedback message includes an ACK/NACK indicator, and the ACK/NACK indicator includes multiple bits.

In a ninety-ninth aspect, in combination with one or more of the ninety-eighth aspect, the apparatus is configured to determine an amount of resources to be requested from the base station, and determine a value of the multiple bits based on the amount.

In a one hundredth aspect, in combination with one or more of the eighty-fifth aspect through ninety-ninth aspect, the apparatus is configured to determine a maximum number of subgroups that the set of resources are splittable into, and receivE an upper layer message; and In a one hundred-first aspect, in combination with the one hundredth aspect, the maximum number of subgroups is determined based on the RRC message.

In a one hundred-second aspect, in combination with one or more of the eighty-fifth aspect through the one hundred-first aspect, the apparatus is configured to generate a feedback message, and transmite the feedback message to the base station.

In a one hundred-third aspect, in combination with the one hundred-second aspect, the feedback message includes a number of ACK/NACK indicators.

In a one hundred-fourth aspect, in combination with the one hundred-second aspect, the feedback message includes an ACK/NACK indicator for each subgroup.

In a one hundred-fifth aspect, in combination with the one hundred-second aspect, the feedback message includes an ACK/NACK indicator for each subgroup of a maximum number of subgroups.

In a one hundred-sixth aspect, in combination with the one hundred-second aspect, the feedback message indicates, for the number of subgroups, a number of ACKs, a number of NACKS, or both.

In a one hundred-seventh aspect, in combination with the one hundred-second aspect, the feedback message includes an ACK/NACK indicator, and the ACK/NACK indicator includes multiple bits.

In a one hundred-eighth aspect, in combination with the one hundred-seventh aspect, the apparatus is configured to determine a value of the multiple bits, and determine an amount of resources requested by the UE based on the value.

In a one hundred-ninth aspect, in combination with one or more of the eighty-fifth aspect through ninety-third aspect, the apparatus is configured to determine, based on a HARQ process ID field of the grant message, a HARQ ID of a first subgroup of the set of sidelink resources.

In a one hundred-tenth aspect, in combination with one or more of the eighty-fifth aspect through ninety-third aspect or the one hundred-ninth aspect, the grant message indicates a number of one or more subgroups of the set of sidelink resources.

In a one hundred-eleventh aspect, in combination with the one hundred-tenth aspect, the apparatus is configured to determine the number of one or more subgroups of the set of sidelink resources, the number of one or more subgroups of the set of sidelink resources is less than or equal to a maximum number of subgroups the set of sidelink resources is splittable into.

In a one hundred-twelfth aspect, in combination with the one hundred-eleventh aspect, the apparatus is configured to receive an RRC message that indicates the maximum number of subgroups.

In a one hundred-thirteenth aspect, in combination with one or more of the eighty-fifth aspect through the ninety-third aspect or the one hundred-ninth aspect through the one hundred-twelfth aspect, an NDI control of the grant message is used for multiple subgroups.

In a one hundred-fourteenth aspect, in combination with one or more of the eighty-fifth aspect through the ninety-third aspect or the one hundred-ninth aspect through the one hundred-twelfth aspect, each subgroup is associated with an NDI control of the grant message.

In a one hundred-fifteenth aspect, in combination with one or more of the eighty-fifth aspect through the ninety-third aspect or the one hundred-ninth aspect through the one hundred-fourteenth aspect, the apparatus is configured to transmit a feedback message to the base station, and the feedback message includes a number of ACK/NACK indicators or the feedback message includes an ACK/NACK indicator for each subgroup.

In a one hundred-sixteenth aspect, in combination with one or more of the eighty-fifth aspect through fourth aspect, the grant message is a single grant message or the grant message grant message includes DCI.

In a one hundred-seventeenth aspect, in combination with the one hundred-sixteenth aspect, the grant message includes a single DCI.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   receiving, from a network node, a grant message indicating a set of sidelink resources and indicating a number of subgroups of sidelink resources in the set of sidelink resources; and
   transmitting multiple unicast messages via multiple subgroups of the subgroups of sidelink resources in the set of sidelink resources, the multiple subgroups of the sidelink resources based on the number of subgroups of sidelink resources.

2. The method of claim 1, further comprising
   configuring the multiple subgroups of the set of sidelink resources; and
   transmitting the multiple unicast messages via the multiple subgroups includes transmitting, via each subgroup of the multiple subgroups, a unicast message of the multiple unicast messages.

3. The method of claim 1, further comprising:
   determining, based on the grant message, the set of sidelink resources; and
   splitting the set of sidelink resources into the multiple subgroups.

4. The method of claim 1, further comprising:
   splitting the set of sidelink resources into the multiple subgroups, wherein the set of sidelink resources are split based on a receive (RX) UE buffer status report and channel state information of an RX UE channel.

5. The method of claim 1, further comprising:
   scheduling the multiple unicast messages; and
   wherein transmitting the multiple unicast messages comprises:
     transmitting, to a first receive (RX) UE, a first unicast message of the multiple unicast messages via a first subgroup of the multiple subgroups; and
     transmitting, to a second RX UE, a second unicast message of the multiple unicast messages via a second subgroup of the multiple subgroups;
   receiving a first ACK/NACK message from the first RX UE responsive to the first unicast message; and
   receiving a second ACK/NACK message from the second RX UE responsive to the second unicast message.

6. The method of claim 1, further comprising:
   generating a buffer status for each of one or more receive (RX) UEs; and
   transmitting a sidelink buffer status report (BSR) to the network node to request sidelink resources.

7. The method of claim 6, further comprising combining the buffer status of multiple RX UEs to generate the sidelink BSR.

8. The method of claim 1, further comprising transmitting a feedback message to the network node, wherein the feedback message comprises an ACK/NACK message, and wherein the ACK/NACK message includes an ACK/NACK indicator for each subgroup of the multiple subgroups.

9. The method of claim 8, wherein:
   the feedback message is responsive to the grant message;
   the feedback message is a single feedback message; or
   a combination thereof.

10. The method of claim 8, wherein the ACK/NACK indicator includes one or more bits.

11. The method of claim 8, wherein wherein the ACK/NACK indicator includes multiple bits, the method further comprising:
    determining an amount of resources to be requested from the network node; and
    determining a value of the multiple bits based on the amount.

12. The method of claim 11, further comprising:
    determining a maximum number of subgroups into which the set of sidelink resources are splitable; and
    receiving an upper layer message;
    wherein the maximum number of subgroups is determined based on the upper layer message.

13. A user equipment (UE) comprising:
    at least one processor; and
    a memory coupled with the at least one processor and storing processor-readable code that,
      when executed by the at least one processor, is configured to cause the UE to:
        receive, from a network node, a grant message indicating a set of sidelink resources and indicating a number of subgroups of sidelink resources in the set of sidelink resources; and
        transmit multiple unicast messages via multiple subgroups of the subgroups of sidelink resources in the set of sidelink resources, the multiple subgroups of the sidelink resources based on the number of subgroups of sidelink resources.

14. The UE of claim 13, wherein the processor-readable code that, when executed by the at least one processor, is further configured to cause the UE to:
    generate a feedback message; and
    transmit the feedback message to the network node.

15. The UE of claim 14, wherein the feedback message includes a number of ACK/NACK indicators.

16. The UE of claim 14, wherein the feedback message includes an ACK/NACK indicator for each subgroup of the multiple subgroups.

17. The UE of claim 14, wherein the feedback message includes an ACK/NACK indicator for each subgroup of a maximum number of subgroups, and wherein the set of sidelink resources are splitable into a maximum number of subgroups.

18. The UE of claim 14, wherein the feedback message indicates, for the number of one or more subgroups, a number of ACKs, a number of NACKS, or both.

19. The UE of claim 14, wherein the feedback message includes an ACK/NACK indicator, and the ACK/NACK indicator includes multiple bits.

20. The UE of claim 19, wherein the processor-readable code that, when executed by the at least one processor, is further configured to cause the UE to:
    determine a value of the multiple bits; and
    determine an amount of resources requested by the UE based on the value.

21. The UE of claim 13, wherein the processor-readable code that, when executed by the at least one processor, is further configured to cause the UE to determine, based on a hybrid automatic repeat request (HARQ) process identity (ID) field of the grant message, a HARQ ID of a first subgroup of the set of sidelink resources.

22. The UE of claim 13, wherein the processor-readable code that, when executed by the at least one processor, is further configured to cause the UE to:

determine the number of one or more subgroups of the set of sidelink resources, the number of one or more subgroups of the set of sidelink resources is less than or equal to a maximum number of subgroups the set of sidelink resources is splitable into; and receive a radio resource control (RRC) message that indicates the maximum number of subgroups.

23. The UE of claim 13, wherein a new data indicator (NDI) control of the grant message is used for multiple subgroups.

24. The UE of claim 13, wherein each subgroup is associated with a new data indicator (NDI) control of the grant message.

25. The UE of claim 13, wherein the processor-readable code that, when executed by the at least one processor, is further configured to cause the UE to:

transmit a feedback message to the network node; and wherein:
  the feedback message includes a number of ACK/NACK indicators; or
  the feedback message includes an ACK/NACK indicator for each subgroup.

26. The UE of claim 13, wherein the grant message is a single grant message, and wherein the grant message includes a single DCI.

27. The method of claim 1, wherein the number of subgroups of sidelink resources in the set of sidelink resources is less than or equal to a maximum number of subgroups into which the set of sidelink resources is splitable.

28. The method of claim 1, further comprising receiving a radio resource control (RRC) message that indicates a maximum number of subgroups.

29. The UE of claim 13, wherein the number of subgroups of sidelink resources in the set of sidelink resources is less than or equal to a maximum number of subgroups into which the set of sidelink resources is splitable.

30. The UE of claim 13, wherein the processor-readable code that, when executed by the at least one processor, is further configured to cause the UE to receive a radio resource control (RRC) message that indicates a maximum number of subgroups.

* * * * *